(12) United States Patent
Gordon et al.

(10) Patent No.: US 8,613,015 B2
(45) Date of Patent: *Dec. 17, 2013

(54) TWO-STAGE PROCESSED VIDEO LINK AGGREGATION SYSTEM

(75) Inventors: Michael M. Gordon, Paradise Valley, AZ (US); Blair R. R. Harrison, Sherman Oaks, CA (US); Adrian K. Roston, Los Angeles, CA (US)

(73) Assignee: Frequency IP Holdings, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,717

(22) Filed: May 11, 2012

(65) Prior Publication Data

US 2012/0291079 A1    Nov. 15, 2012

(30) Foreign Application Priority Data

Apr. 29, 2011    (AU) ................................ 2011202182

(51) Int. Cl.
| | |
|---|---|
| H04N 5/445 | (2011.01) |
| H04N 7/10 | (2006.01) |
| H04N 7/025 | (2006.01) |
| H04N 7/173 | (2011.01) |
| G06F 3/00 | (2006.01) |
| G06F 13/00 | (2006.01) |

(52) U.S. Cl.
USPC ................ 725/34; 725/38; 725/61; 725/100; 725/109

(58) Field of Classification Search
None
See application file for complete search history.

(56) References Cited

U.S. PATENT DOCUMENTS

| | | |
|---|---|---|
| 5,485,197 A | 1/1996 | Hoarty |
| 5,499,330 A | 3/1996 | Lucas et al. |
| 5,515,486 A | 5/1996 | Amro et al. |
| 5,621,874 A | 4/1997 | Lucas et al. |
| 5,677,708 A | 10/1997 | Matthews, III et al. |
| 5,689,287 A | 11/1997 | Mackinlay et al. |
| 5,706,448 A | 1/1998 | Blades |
| 5,745,109 A | 4/1998 | Nakano et al. |
| 5,754,809 A | 5/1998 | Gandre |
| 5,880,733 A | 3/1999 | Horvitz et al. |
| 5,940,076 A | 8/1999 | Sommers et al. |
| 5,977,974 A | 11/1999 | Hatori et al. |
| 5,986,638 A | 11/1999 | Cheng |

(Continued)

FOREIGN PATENT DOCUMENTS

| | | |
|---|---|---|
| KR | 10-2009-0079662 A | 7/2009 |
| KR | 10-2010-0003666 A | 1/2010 |
| WO | 2011/095693 A1 | 8/2011 |
| WO | 2011/148054 A1 | 12/2011 |

OTHER PUBLICATIONS

Australian Patent Office, Examiner's First Report on Patent Application No. 20111202182, mailed on Jun. 10, 2011, 2 pages.

(Continued)

*Primary Examiner* — Dominic D Saltarelli
(74) *Attorney, Agent, or Firm* — Kilpatrick Townsend & Stockton LLP

(57) ABSTRACT

Methods and systems for presentation of content through an interface to provide personalized video feeds to a user. A video feed is harvested from feed items gathered at various Internet sources. The feed items are filtered to remove those that do not link to video content. A criteria specified by the user is used to filter the feed items.

20 Claims, 20 Drawing Sheets

(56) References Cited

U.S. PATENT DOCUMENTS

| | | | |
|---|---|---|---|
| 5,991,799 A * | 11/1999 | Yen et al. | ............ 709/218 |
| 6,005,579 A | 12/1999 | Sugiyama et al. | |
| 6,016,145 A | 1/2000 | Horvitz et al. | |
| 6,023,275 A | 2/2000 | Horvitz et al. | |
| 6,069,606 A | 5/2000 | Sciammarella et al. | |
| 6,118,480 A | 9/2000 | Anderson et al. | |
| 6,198,483 B1 | 3/2001 | Launais | |
| 6,211,921 B1 | 4/2001 | Cherian et al. | |
| 6,230,116 B1 | 5/2001 | Ronen et al. | |
| 6,266,098 B1 | 7/2001 | Cove et al. | |
| 6,411,307 B1 | 6/2002 | Rosin et al. | |
| 6,448,987 B1 | 9/2002 | Easty et al. | |
| 6,466,237 B1 | 10/2002 | Miyao et al. | |
| 6,473,751 B1 | 10/2002 | Nikolovska et al. | |
| 6,515,656 B1 | 2/2003 | Wittenburg et al. | |
| 6,570,582 B1 | 5/2003 | Sciammarella et al. | |
| 6,577,330 B1 | 6/2003 | Tsuda et al. | |
| 6,628,313 B1 | 9/2003 | Minakuchi et al. | |
| 6,636,246 B1 | 10/2003 | Gallo et al. | |
| 6,662,177 B1 | 12/2003 | Martino et al. | |
| 6,680,749 B1 | 1/2004 | Anderson et al. | |
| 6,693,606 B1 | 2/2004 | Shitisawa et al. | |
| 6,819,344 B2 | 11/2004 | Robbins | |
| 6,839,072 B2 | 1/2005 | Trajkovic et al. | |
| 6,918,091 B2 | 7/2005 | Leavitt et al. | |
| 6,961,943 B2 | 11/2005 | Miller et al. | |
| 6,973,628 B2 | 12/2005 | Asami | |
| 6,983,426 B1 | 1/2006 | Kobayashi et al. | |
| 6,990,637 B2 | 1/2006 | Anthony et al. | |
| 7,013,435 B2 | 3/2006 | Gallo et al. | |
| 7,036,091 B1 | 4/2006 | Nguyen | |
| 7,051,291 B2 | 5/2006 | Sciammarella et al. | |
| 7,065,710 B2 | 6/2006 | Hayashi et al. | |
| 7,091,998 B2 | 8/2006 | Miller-Smith | |
| 7,093,201 B2 | 8/2006 | Duarte | |
| 7,111,788 B2 | 9/2006 | Reponen | |
| 7,137,075 B2 | 11/2006 | Hoshino et al. | |
| 7,139,001 B2 | 11/2006 | Hoddie et al. | |
| 7,139,006 B2 | 11/2006 | Wittenburg et al. | |
| 7,159,177 B2 | 1/2007 | Billmaier et al. | |
| 7,263,667 B1 | 8/2007 | Hoellerer et al. | |
| 7,271,734 B2 | 9/2007 | Sata et al. | |
| 7,296,242 B2 | 11/2007 | Agata et al. | |
| 7,350,157 B1 | 3/2008 | Billmaier et al. | |
| 7,380,260 B1 | 5/2008 | Billmaier et al. | |
| D571,821 S | 6/2008 | Amacker | |
| 7,383,503 B2 | 6/2008 | Banks | |
| D573,605 S | 7/2008 | Amacker | |
| 7,412,650 B2 | 8/2008 | Gallo | |
| 7,412,660 B2 | 8/2008 | Donalson | |
| 7,418,671 B2 | 8/2008 | Hama et al. | |
| 7,426,467 B2 | 9/2008 | Nashida et al. | |
| 7,487,459 B2 | 2/2009 | Billmaier et al. | |
| 7,523,416 B2 | 4/2009 | Johnson et al. | |
| D591,765 S | 5/2009 | Amacker | |
| 7,543,245 B2 | 6/2009 | Irimajiri | |
| D596,190 S | 7/2009 | Garcia | |
| 7,562,312 B2 | 7/2009 | Rochford et al. | |
| 7,574,656 B2 | 8/2009 | Billmaier et al. | |
| 7,581,195 B2 | 8/2009 | Sciammarella et al. | |
| 7,594,246 B1 | 9/2009 | Billmaier et al. | |
| 7,607,107 B2 | 10/2009 | Iten et al. | |
| D604,742 S | 11/2009 | Nagata et al. | |
| D605,199 S | 12/2009 | Nagata et al. | |
| D609,243 S | 2/2010 | Song | |
| 7,681,150 B2 | 3/2010 | Hsieh et al. | |
| 7,685,530 B2 | 3/2010 | Sherrard et al. | |
| D615,098 S | 5/2010 | Winjum | |
| 7,710,423 B2 | 5/2010 | Drucker et al. | |
| 7,720,349 B2 | 5/2010 | Ogikubo | |
| 7,730,425 B2 | 6/2010 | De Los Reyes et al. | |
| 7,900,161 B2 | 3/2011 | Nakamura et al. | |
| 8,151,215 B2 | 4/2012 | Baurmann et al. | |
| 8,154,549 B2 | 4/2012 | Abe et al. | |
| 8,434,015 B2 | 4/2013 | Nozaki et al. | |
| 2002/0032696 A1 | 3/2002 | Takiguchi et al. | |
| 2002/0033848 A1 | 3/2002 | Sciammarella et al. | |
| 2002/0126121 A1 | 9/2002 | Robbins | |
| 2002/0138617 A1 | 9/2002 | Christfort et al. | |
| 2003/0048295 A1 | 3/2003 | Lilleness et al. | |
| 2003/0061206 A1 * | 3/2003 | Qian | ............ 707/3 |
| 2003/0093794 A1 | 5/2003 | Thomas et al. | |
| 2003/0222890 A1 | 12/2003 | Salesin et al. | |
| 2004/0100479 A1 | 5/2004 | Nakano et al. | |
| 2004/0150657 A1 | 8/2004 | Wittenburg et al. | |
| 2004/0155907 A1 | 8/2004 | Yamaguchi et al. | |
| 2004/0210567 A1 | 10/2004 | Bourdoncle | |
| 2005/0010876 A1 | 1/2005 | Robertson et al. | |
| 2005/0086611 A1 | 4/2005 | Takabe et al. | |
| 2005/0091596 A1 | 4/2005 | Anthony et al. | |
| 2005/0108755 A1 | 5/2005 | Nishikawa et al. | |
| 2005/0187943 A1 | 8/2005 | Finke-Anlauff et al. | |
| 2005/0229102 A1 | 10/2005 | Watson et al. | |
| 2005/0289482 A1 | 12/2005 | Anthony et al. | |
| 2006/0048076 A1 | 3/2006 | Vronay et al. | |
| 2006/0095628 A1 | 5/2006 | Ludwig et al. | |
| 2006/0174211 A1 | 8/2006 | Hoellerer et al. | |
| 2006/0190817 A1 | 8/2006 | Banks | |
| 2006/0209062 A1 | 9/2006 | Drucker | |
| 2007/0028279 A1 * | 2/2007 | Kim | ............ 725/113 |
| 2007/0061745 A1 | 3/2007 | Anthony et al. | |
| 2007/0067736 A1 | 3/2007 | Aaltonen | |
| 2007/0101364 A1 | 5/2007 | Morita | |
| 2007/0139410 A1 | 6/2007 | Abe et al. | |
| 2007/0220431 A1 | 9/2007 | Nakamura et al. | |
| 2007/0225047 A1 | 9/2007 | Bakos | |
| 2008/0034276 A1 | 2/2008 | Ficco | |
| 2008/0195701 A1 | 8/2008 | Venkatsubra et al. | |
| 2009/0055746 A1 | 2/2009 | Dimitrova et al. | |
| 2009/0125842 A1 | 5/2009 | Nakayama | |
| 2009/0240693 A1 | 9/2009 | Davidson | |
| 2009/0315867 A1 | 12/2009 | Sakamoto et al. | |
| 2009/0328101 A1 | 12/2009 | Suomela et al. | |
| 2010/0100537 A1 | 4/2010 | Druzgalski et al. | |
| 2010/0241976 A1 | 9/2010 | Nozaki et al. | |
| 2010/0257484 A1 | 10/2010 | Nakamura et al. | |
| 2010/0277496 A1 | 11/2010 | Kawanishi et al. | |
| 2010/0293560 A1 | 11/2010 | Bland et al. | |
| 2010/0293580 A1 | 11/2010 | Latchman | |
| 2010/0313166 A1 | 12/2010 | Nakayama et al. | |
| 2010/0313255 A1 | 12/2010 | Khuda | |
| 2011/0276923 A1 | 11/2011 | Zambetti et al. | |
| 2012/0005702 A1 | 1/2012 | Tindell | |
| 2012/0056889 A1 | 3/2012 | Carter et al. | |
| 2012/0120316 A1 | 5/2012 | Lee | |
| 2012/0150994 A1 | 6/2012 | Coad et al. | |
| 2012/0246596 A1 | 9/2012 | Ording et al. | |
| 2012/0278428 A1 | 11/2012 | Harrison et al. | |
| 2012/0278725 A1 | 11/2012 | Gordon et al. | |
| 2012/0288260 A1 | 11/2012 | Potrebic et al. | |
| 2012/0317218 A1 | 12/2012 | Anderson et al. | |
| 2012/0329540 A1 | 12/2012 | Wayans et al. | |
| 2013/0014059 A1 | 1/2013 | Nakayama | |
| 2013/0132994 A1 | 5/2013 | Murphy et al. | |

OTHER PUBLICATIONS

"Fuugo TV product release at CES 2011," uploaded Jan. 3, 2011 by axeltechnologies, 5 mins 36 seconds. Retrieved from: http://www.youtube.com/watch?v=zwC1dXF4wgg.

"Fuugo Introduction," uploaded Feb. 14, 2010 by axeltechnologies, 2 mins 5 seconds. Retrieved from: http://www.youtube.com/watch?v=mlwc_HQqkyM.

"Fuugo Video 1.0 Introduction," uploaded Nov. 7, 2011 by FuugoVideo, 49 seconds. Retrieved from: http://www.youtube.com/watch?v=L7fZaae2wMA.

International Search Report and Written Opinion of PCT/US2011/034653 mailed Dec. 20, 2011, 9 pages.

"[MWC] Interactive television of the future: Fuugo," uploaded by channelintel on Feb. 16, 2010, 2 mins 56 seconds. Retrieved from: http://www.youtube.com/watch?v=-pTIEioX3Ek.

(56) References Cited

OTHER PUBLICATIONS

International Search Report and Written Opinion of PCT/US2012/035854 mailed Oct. 30, 2012, 12 pages.
U.S. Appl. No. 13/296,183, Office Action mailed Nov. 7, 2012, 17 pages.
U.S. Appl. No. 13/460,305, Office Action mailed Sep. 20, 2012, 4 pages.
U.S. Appl. No. 13/460,305, Office Action mailed Jan. 2, 2013, 3 pages.
Bing search results "Carousel Video Feed," search conducted Jun. 12, 2013, 1 page. Accessed at: http://www.bing.com/search?q=carousel+video+feed . . . .
Bing search results "Carousel Video Feed Icon," search conducted Jun. 12, 2013, 1 page. Accessed at: http://www.bing.com/search?q=carousel+video+feed+icon . . . .
Bing search results "Carousel Video Feed Combine Icon," search conducted Jun. 12, 2013, 1 page. Accessed at: http://www.bing.com/search?q=carousel+video+Feed+combine+icon . . . .
U.S. Appl. No. 13/296,183, filed Nov. 14, 2011, Notice of Allowance mailed May 1, 2013, 23 pages.
U.S. Appl. No. 13/460,305, filed Apr. 30, 2012 Notice of Allowance mailed Jun. 18, 2013, 35 pages.
U.S. Appl. No. 13/717,597, filed Dec. 17, 2012 First Action Interview Pre-interview Communication mailed May 22, 2013, 4 pages.

* cited by examiner

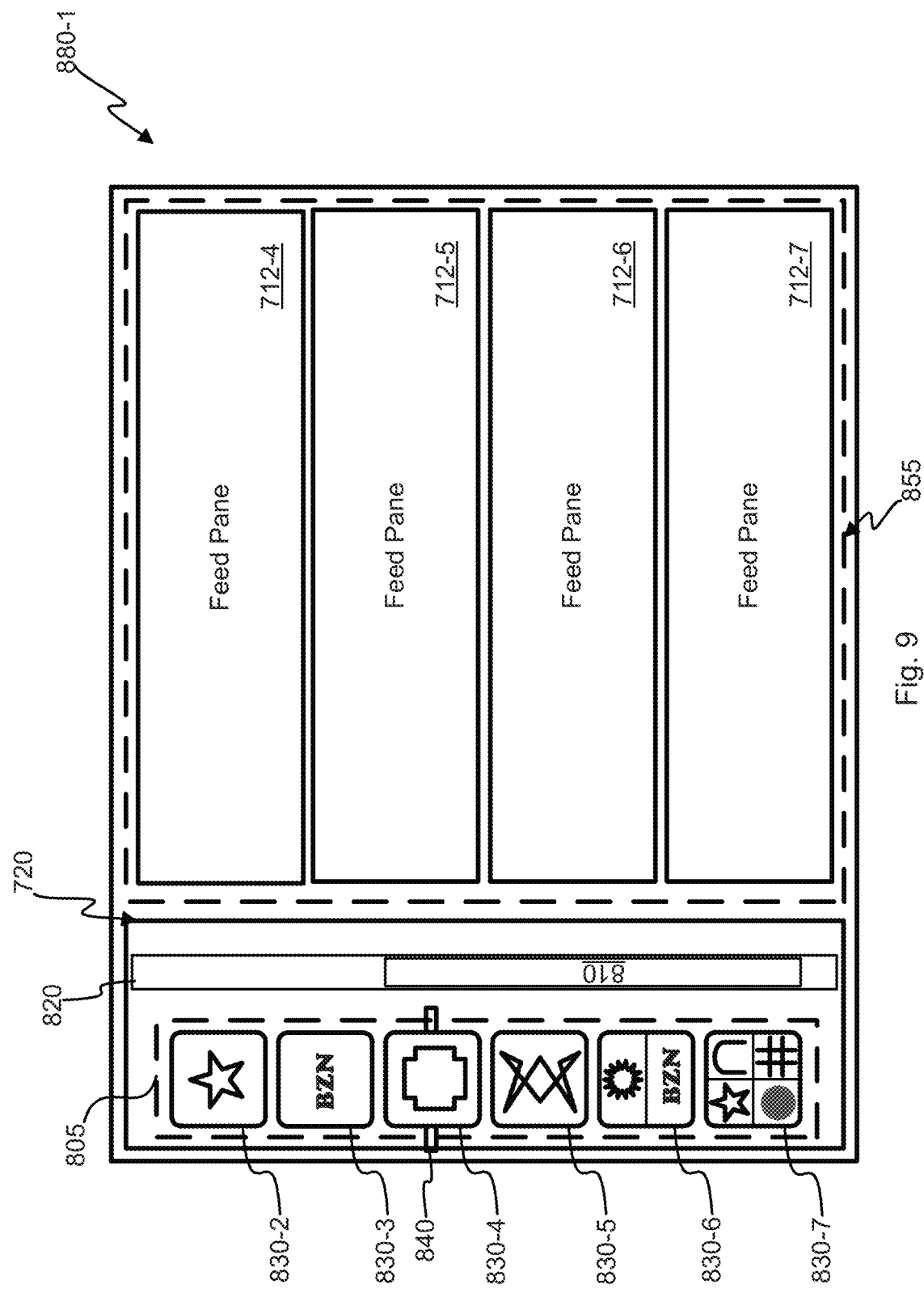

TWO-STAGE PROCESSED VIDEO LINK AGGREGATION SYSTEM

CROSS-REFERENCE TO RELATED APPLICATION

This application is related by priority to Australian Patent Application Serial No. 2011202182, filed May 11, 2011, PCT/US2011/034653, filed Apr. 29, 2011, U.S. patent application Ser. No. 13/296,183, filed Nov. 14, 2011, PCT/US2012/35854 filed Apr. 30, 2012, and U.S. patent application Ser. No. 13/460,305 filed Apr. 30, 2012 all of which are incorporated herein by reference in their entirety.

BACKGROUND

This application relates in general to creation of, and presentation of, selective digital service feeds and, but not by way of limitation, to creation of, and presentation of, selective digital service feeds comprising primarily or exclusively video and video-related content.

There are many services available to users through the use of the Internet, including websites, other Internet sites, publishing services, media services, data services, information services, electronic commerce services, electronic transaction services, payment services, software and content download services, communications services, other remotely accessed sites and services, and other digital sites, centers, destinations, or systems; whether shared or dedicated, public or private, institutional or personal, fixed or mobile, wired or wireless; and whether accessed through a browser, mini-browser, embedded browser, application, other software program, or other interface. Examples of popular Internet services in widespread use today include, but are not limited to: content websites that may include primarily video or audio content, primarily text and graphics (including photographs) content, or a mixture of several content and media types, including websites such as CNN.com™, Politico.com™, HuffingtonPost.com™, NYTimes.com™, and others; video publishing websites, such as YouTube™, DailyMotion™, Metacafe™, and others; entertainment content services, such as Netflix™, Pandora™, Hulu™, Zynga™; social networking sites, such as Facebook™, Twitter™, and MySpace™; and many others.

Digital content provided by Internet services can include any of, all of, or any combination of proprietary content, exclusively or non-exclusively licensed content, syndicated content, member-provided content, user-provided content, system-generated content, messages or emails from one or more users to one or more other users, social content, comments, ratings, embedded links to other digital content, tags, maps, locations, time and date content, user identifiers, source identifiers, and other related or unrelated content. The hyperlinked structure of the World Wide Web and the Hypertext Transfer Protocol, the advanced capabilities of modern web browsers, the ability (built into an increasing range of modern user devices) to execute programs, the flexibility inherent in application software developed and delivered to user devices, the rise of common platforms that support both broadly deployed and more narrowly focused functionality across many discrete Internet services, and the ability to stream data and content from, to, and among users and Internet services in realtime or near realtime, individually and collectively have increasingly allowed Internet services to create content and data feeds that are simple, complex, or compound, and include as many, or as few, diverse components as is desired.

A user may use more than one Internet service, sequentially, concurrently, or simultaneously; may use different Internet services with different degrees of interest, intensity, frequency, sophistication, depth of knowledge of the service, and/or skill; and may vary her selection and mix of services from time to time, or over time, according to tasks and interests, because of the Internet service choices of others, according to her choice of device at the moment or over time, or for other reasons.

Users increasingly use devices other than, or in addition to, browser-equipped personal computers to access Internet services, including SMS-capable and other mobile phones, web-equipped mobile phones, smartphones, Internet-ready television sets, digital set-top boxes, DVD and Blu-Ray players, digital video recorders, videogame consoles, tablets such as the iPad™, and other devices. These devices exhibit a wide array of form factors, memory, storage, displays, output interfaces, user input interfaces and devices, and other peripherals and components. Users may have preferences and habits that influence or determine the choice of device for a given purpose, for a given time and place, or for a given mode of use, because of, or regardless of, such device aspects.

There are numerous standards available for use in browsers, browser-equipped personal computers, and the numerous other devices used by users to access Internet services. These standards are sometimes deployed in mass production products before being finally determined, at different times for different products, in heterogeneous technical implementations, and with varying degrees of completeness; they often evolve over time, at times discontinuously; and they fluctuate in popularity. As a result, devices are not always technically uniform, and not all such standards are supported by all device and component providers. For example, some browsers support HTML5 and some browsers do not; different HTML5-ready browsers support different media standards (e.g., when rendering content identified with the <video> tag some support H.264, whereas others support WebM™ or another video codec); some devices support Adobe™ Flash™, while some devices do not (e.g., Apple™ iPhone™ and iPad™ do not); or, one set-top box may support MPEG2 video but not H.264 video, whereas another may support both and a third may support just H.264. In addition, there are diverse content security schemes deployed across devices, including proprietary encryption schemes, consortia-based encryption schemes, and other encryption schemes; and there are diverse rights management and user authentication schemes, including consortia-based schemes, such as Ultra-Violet™, and vendor-proprietary schemes, such as Disney™ Keychest™ and Apple™ iTunes™.

As the variety and capability of devices available to users have increased and as user behavior has evolved in response to new devices and capabilities, content company strategies have also evolved. Aspects of evolving content company strategies include: blocking some or all devices from accessing some or all content; modifying or customizing technical versions of content available on some or all devices; modifying or customizing editorial versions of content available on some or all devices; modifying or customizing advertising, sponsorships, or other promotional aspects presented in conjunction with content accessed via some or all devices; making content available on different devices with different access prices, terms, user rights and privileges, and other conditions; and many other strategy variations. Content company strategies and aspects of strategies commonly vary from device to device, from content company to content company on a given device, and from one geography to another. For example, in the United States, ABC™/Disney™ makes most ABC™ network television shows available on broadcast television with commercials, online with commercials, and online for download via Apple™ iTunes™ without commercials but at a charge per episode, but blocks the availability of these shows on GoogleTV™; while at the same time, it makes most Disney™ network television shows available on broadcast television without commercials, online with commercials, and online for download via iTunes™ without commercials but at a charge per episode, and blocks the availability of these shows on GoogleTV™.

Most Internet services operate legitimately. Legitimate Internet services may properly obtain rights to content through licensing, syndication, fair use, government permission, or other legitimate methods, or may produce content of their own, or may pursue a combination of these and other methods. Some Internet services, however, are less concerned about obtaining proper rights to content, and may rely on their users to have obtained rights, may rely on actual or alleged legal safe harbor provisions, or may pay little or no attention to rights questions. The problem of intellectual property piracy has increased as user Internet use has increased.

SUMMARY

In various embodiments, methods and systems for presentation of content through an interface to provide personalized video feeds to a user are disclosed. A video feed is harvested from feed items gathered at various Internet sources. The feed items are filtered to remove those that do not link to video content. A criteria specified by the user is used to filter the feed items.

In another embodiment, a video processing system for providing personalized video content feeds to users from the Internet is disclosed. The video processing system comprises a service feed, an aggregation system and a selective video feed. The service feed is acquired from an internet service, which is accessible from the Internet. The service feed comprises a plurality of feed items arranged in the first service feed serially. The service feed includes the plurality of feed items that each include a first separately resolvable link to another content item available from the Internet. The aggregation system that is configured to: receive the service feed; remove from the service feed a plurality of non-video feed items that do not link to video content available from the Internet; and remove from the service feed a plurality of filtered feed items that either meet or do not meet a predetermined criteria. The selective video feed comprises a plurality of remaining feed items that exclude the plurality of non-video feed items and the plurality of filtered feed items.

In yet another embodiment, a method for providing personalized video content feeds to users from the Internet is disclosed. A service feed is acquired, including a plurality of feed items arranged serially that link to content objects, which are available from the Internet with an Internet service. The service feed is filtered to remove from the service feed a plurality of non-video feed items that do not link to video content available from the Internet. The service feed is filtered to remove from the service feed a plurality of filtered feed items that either meet or do not meet a predetermined criteria. A selective feed is sent to a user that comprises a plurality of remaining feed items that exclude the plurality of non-video feed items and the plurality of filtered feed items.

In still another embodiment, a method for providing personalized video feeds to a user gathered from the Internet. Selection of a content feed is received, including a plurality of feed items arranged serially that link to content objects, which are available from the Internet from an Internet service. A criteria is received from a user that specifies filtering of the service. Those feed items of the service feed that do not link to video objects available over the Internet are removed from the service feed. Those feed items of the service feed that are specified by the criteria are removed from the service feed. A subset of the plurality of feed items are sent toward the user, where the subset is defined by the two preceding sentences.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Methods and systems for presentation of content through an interface to provide personalized video feeds to a user are disclosed. The video feeds are harvested from feed items gathered at various Internet sources. Those video feeds are referenced by icons or channels that rotate about or scroll or move within a first carousel. Video feeds are arranged in columns and/or rows that rotate about or scroll or move within a second carousel. Movement in one carousel causes movement in the other in a synchronous manner even though the movement may be at different speeds.

In another embodiment, a content presentation interface for providing personalized video feeds to users from a variety of Internet sources is disclosed. The content presentation interface comprises a first carousel comprising a number of pointers to a number of video feeds and a second carousel comprising rows or columns. Each of the number of video feeds is acquired from Internet services accessible with the Internet. Each of the number of video feeds includes a number of feed items. Each of the number of feed items is defined by a separately resolvable universal resource indicator (URI) to another content item available with the Internet. The second carousel comprises rows or columns that each reference a number feed items of the number of video feeds. The first carousel and second carousel rotate as a function of movement of the other.

In yet another embodiment, a method for presenting content through an interface to provide personalized video feeds to a user from various Internet sources is disclosed. A number of pointers to a number of video feeds is produced, where each video feed is acquired from Internet services accessible with the Internet and includes a number of feed items. Each video feed item is defined by a separately resolvable universal resource indicator (URI) to another content item available with the Internet. The number of pointers are programmed to display along a first carousel in the interface for the user. A number of video feeds that each reference a number of feed items are produced. Causing arrangement of the number of video feeds in a second carousel. Each of the number of video feeds is arranged in a column or row. The first carousel and second carousel are programmed to rotate as a function of movement of the other.

In still another embodiment, a method for presenting content through an interface to provide personalized video feeds to a user from various Internet sources is disclosed. A number of pointers to a number of video feeds is provided. Each video feed is acquired from Internet services accessible with the Internet and includes a number of feed items. Each video feed item is defined by a separately resolvable universal resource indicator (URI) to another content item available with the Internet. The number of pointers is displayed along a first carousel in the interface for the user. A number of video feeds that each reference a number of feed items is determined. The number of video feeds are arranged in a second carousel, where each of the number of video feeds is arranged in a column or row. The first carousel and second carousel are rotated as a function of movement of the other.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 9 depicts an embodiment of a first pane of the user interface to the aggregation system;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
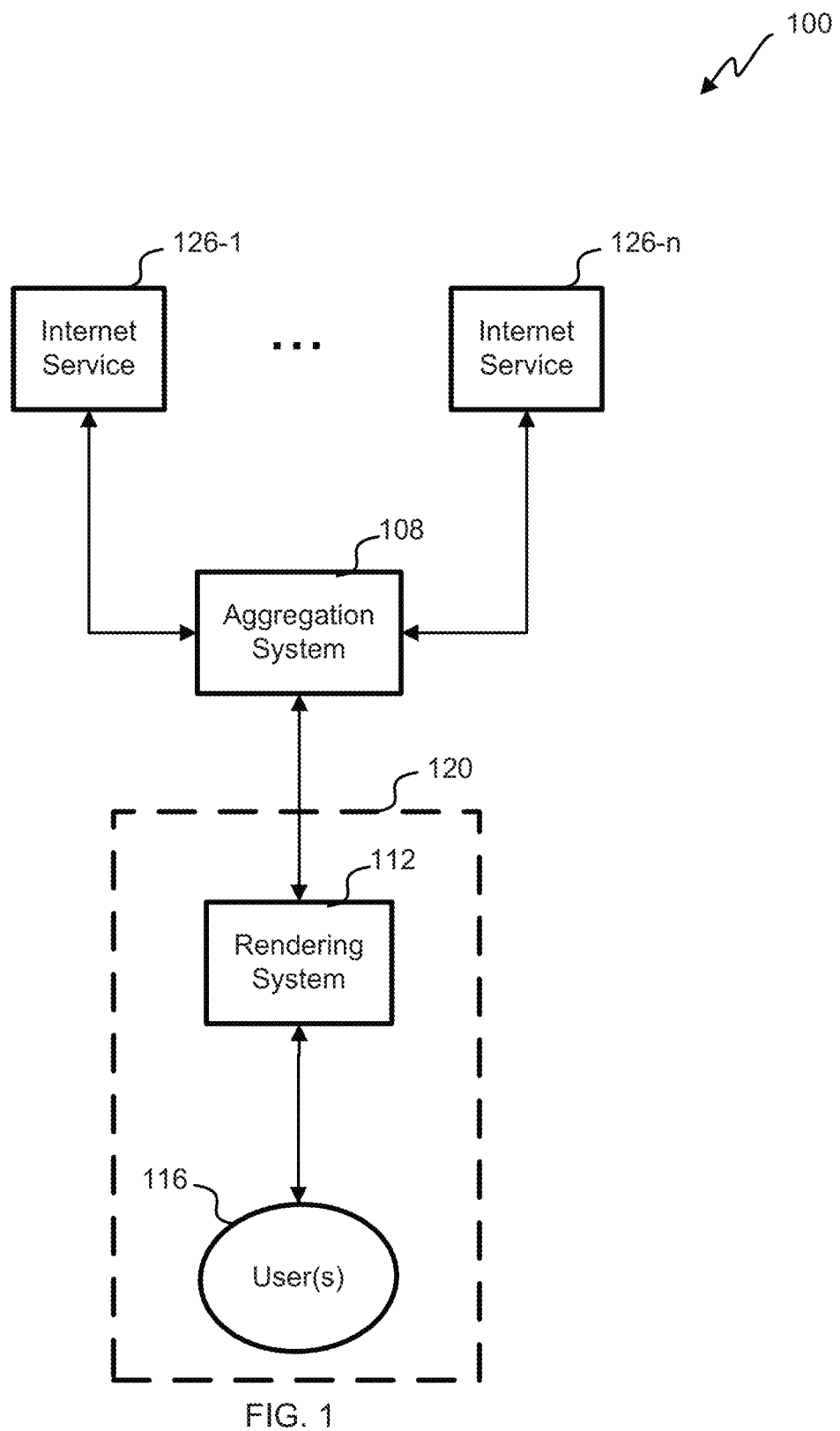
FIG. 1 depicts a block diagram of an embodiment of an Internet system that aggregates two or more Internet service feeds.
Figure 2A:
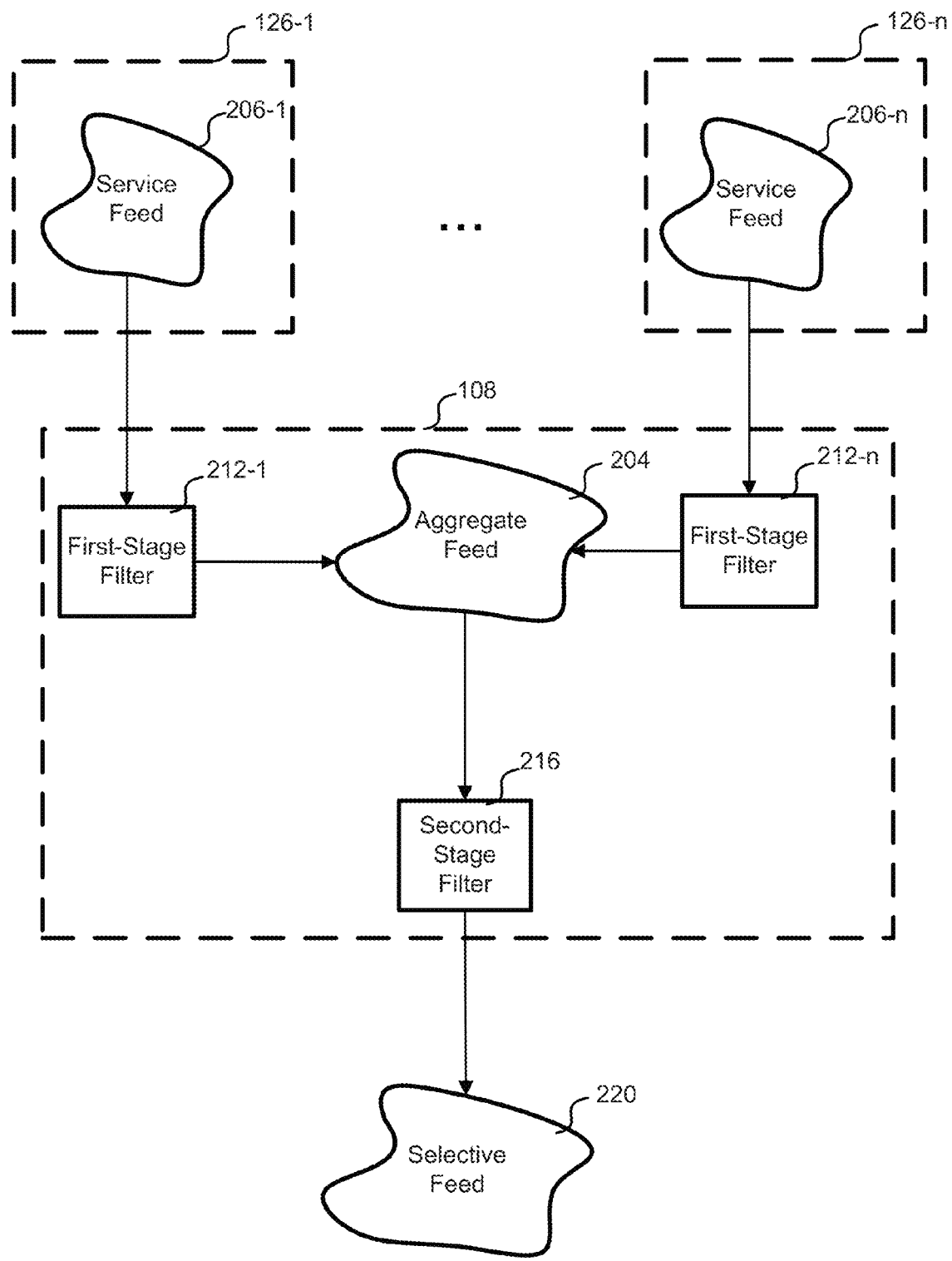
FIGS. 2A, 2B and 2C depict diagrams of embodiments of a feed processing flow.

Referring first to FIGS. 1 and 2A, a primary embodiment is shown that includes an Internet system 100 that aggregates two or more Internet service feeds 206. FIG. 1 shows a block diagram of the Internet system 100 without showing the Internet or other network that couples the various blocks together. FIG. 2 shows a functional diagram of various feeds and filters that operate to convert service feeds 206 into selective feeds 220. Only a single selective feed 220 and a single user 116 is shown, but it is to be understood that there are many different selective feeds 220 for many different users 116 supported by the Internet system 100. An aggregation system 108 selectively and optionally narrows the aggregate of the service feeds 206 into one or more selective feeds 220, and presents the selective feed(s) 220 to a user 116 viewing with a rendering system/device/agent 112 at a user location 120. In this disclosure, the singular and plural terms "selective feed" and "selective feeds" are used interchangeably for convenience, clarity and readability, to mean one or more selective feeds 220, and should be interpreted accordingly. In the primary embodiment, a selective feed 220 is created from the aggregate of service feeds 206 by including only items from the aggregate of service feeds 206 which are, contain, refer to, or otherwise indicate, video content. This creates a condensed and video-specific selective feed 220 from the aggregate of service feeds 206. The Internet services 126 are generally operated by third parties (e.g., websites, Facebook™, YouTube™, Twitter™).

In other embodiments, a selective feed 220 is created by selecting (meaning to include and/or exclude) items which are, contain, refer to, or otherwise indicate one or more media types other than video or in addition to video; is created from a single Internet service feed 206 by selecting items which are, contain, refer to, or otherwise indicate video content; is created from a single Internet service feed 206 by selecting items which are, contain, refer to, or otherwise indicate one or more media types other than video or in addition to video; is created from a single Internet service feed 206 or from an aggregate of more than one Internet service feed 206 by selectively narrowing the single service feed 206 or aggregate of service feeds (i.e., an aggregate feed 204) by selecting items which are, contain, refer to, or otherwise indicate video content and based on one or more other criteria, including user, Internet service, user within Internet service, source, user within source, user ratings or rankings, user comments, keywords, tags, user tags, topic, category, language, other content indicators, length, format and/or codec, fidelity (such as standard definition, 720p, 1080p), time and/or date, device 112, or location; is created from a single Internet service feed 206 or from an aggregate feed 204 by selectively narrowing the single feed 206 or aggregate feed 204 by selecting items which are, contain, refer to, or otherwise indicate one or more media types other than video or in addition to video, and based on one or more other criteria, including user, Internet service, user within Internet service, source, user within source, user ratings or rankings, user comments, keywords, tags, user tags, topic, category, language, other content indicators, length, format and/or codec, fidelity (such as standard definition, 720p, 1080p), time and/or date, device 112, or location respectively, optionally through use of a first-stage filter 212 or a second-stage filter 216 or both; or is created from a single Internet service feed 206 or from an aggregate feed 204 by selectively narrowing the single service feed 206 or aggregate feed 204 by selecting items based on other similar or dissimilar criteria respectively, optionally through use of a first-stage filter 212 or a second-stage filter 216 or both.

In the primary embodiment, the user configures which Internet service feeds 206 will be aggregated as the basis for her selective feed(s) 220 and supplies whatever credentials are required in order to enable the aggregation system 108 to collect the configured service feeds 206. The selective feed 220 is produced from one or more service feeds 206 with optional first-stage filtering 212 that are collected into an aggregate feed 204 that may have an optional second-stage filter 216. Some feeds may be specific to her, for example her Twitter™ service feed 206 (which, although it may comprise the Twitter™ messages ["tweets"] of many Twitter™ users, will contain only those of the feeds that she follows) or her email service feed 206 (inbound email messages); in many such cases, the ability of the aggregation system 108 to access these service feeds 206 will depend on the user 116 supplying her credentials, typically her username and password, for the aggregation system 108 to use. In the primary embodiment, a user 116 can provide access credentials for other Internet services 126, either permanently (allowing the aggregation system 108 to store the credentials) or temporarily (the aggregation system 108 uses the credentials for the current session but does not store them, or stores them temporarily), and can revoke access, in effect disconnecting a given service feed 206 from the aggregation system 108. Other service feeds 206 may be freely available service feeds 206, such as published service feeds 206, for example a YouTube™ channel or the RSS feed of a website; service feeds 206 such as these often will not require any credentials. In the primary embodiment, these service feeds 206 can be configured or de-configured, even though there may be no access credentials required to access, or to revoke, these service feeds 206. Other service feeds 206 may be created by, or made available to, the aggregation system 108 by querying one or more websites or other publicly available or privately available Internet content sources or services 126.

Figure 2B:
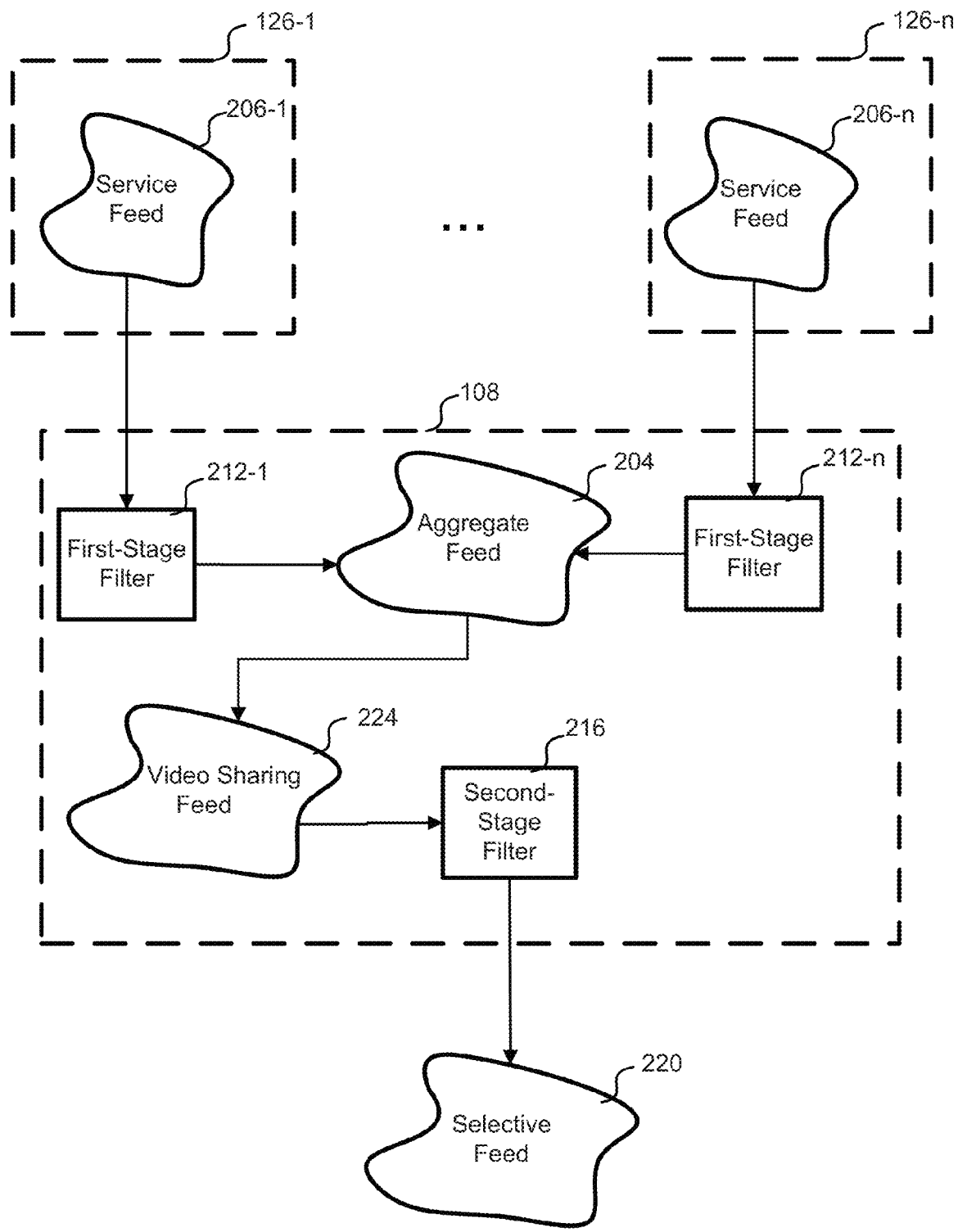

FIG. 2B shows an embodiment where an aggregate feed 204 developed by one user 116 is made available to other users of the aggregation system 108 just like any other service feed 206. Any user 116 can subscribe to another user's aggregation feed 204 as a video-sharing feed 224 so long as the original user has not marked the aggregation feed 204 as private. A user 116 can suggest their aggregation feed 204 or a video-sharing feed 224 to other users. In the example of FIG. 2B, one user has configured an aggregate feed 204 from a number of service feeds 206 with optional first-stage filtering. The aggregate feed 204 is mirrored to a video sharing feed 224 that is available to another user that optionally specifies a second stage filter 216 to create a selective feed 220.

In the primary embodiment, a user 116 creates a username and password, or uses other credentials she has created (such as her Facebook™ username and password, via Facebook™ Connect) or that are available to her (such as her employer-assigned username, password, or other credentials, or such as system-created credentials, including credentials that precisely, loosely, approximately, or otherwise identify her or associate her with one or more services or resources), to access and control her selective feed 220 (configure and reconfigure the service feeds 206 that will be aggregated to create her selective feed 220, connect and configure rendering systems 112, and perform other control and configuration functions). In other embodiments, a user 116 can use other access credentials or methods, or is required to use no access credentials or methods, to access or to control some or all aspects of her selective feed 220 through the aggregation system 108.

As described previously in the primary embodiment, some Internet service feeds 206 (which will be included in the aggregation of feeds as the basis for a user's selective feed), such as Twitter™ service feeds 206 or service feeds 206 from email accounts, may consist, in part or entirely, of items that can be identified to particular users or other sub-entities within the overall service feed 206; for example, a Twitter™ service feed 206 comprises messages that can normally be identified with one or more particular Twitter™ users, Twitter™ accounts, or Twitter™ lists. In addition, feed items from an Internet service feed 206 (which will be included in the aggregation of service feeds 206 as the basis for a user's selective feed 220), may have other optional or mandatory attributes; for example, messages in an email feed may have a priority flag, a spam flag, or one or more other attributes. In an optional aspect of the preferred embodiment, a user can further configure a specific Internet service feed 206 (which will be aggregated as the basis for a user's selective feed 220) to include or exclude feed items from aggregation into the basis for the user's selective feed 220, based on the user, account, list, entity, or other attribute or characteristic of items in the Internet service feed 206.

In the primary embodiment, the aggregation system 108 is implemented as an Internet service and supports two or more users. Accordingly, in the primary embodiment the aggregation system 108 collects Internet service feeds 206 as configured for each one of the multiple users 116 of the aggregation system 108, and selectively narrows the aggregated feeds 204 and/or video sharing feeds 224 into one or more selective feeds 220 for each user. In other embodiments, the system 100 is implemented as an Internet aggregation system 108 that supports only one user 116; is implemented as software deployed on one or more user devices or rendering systems 112 and supporting one or more users 116 of those devices 112; is implemented as software deployed in an Internet network supporting one or more users 116; or is implemented as a feature of another Internet service.

Figure 2C:
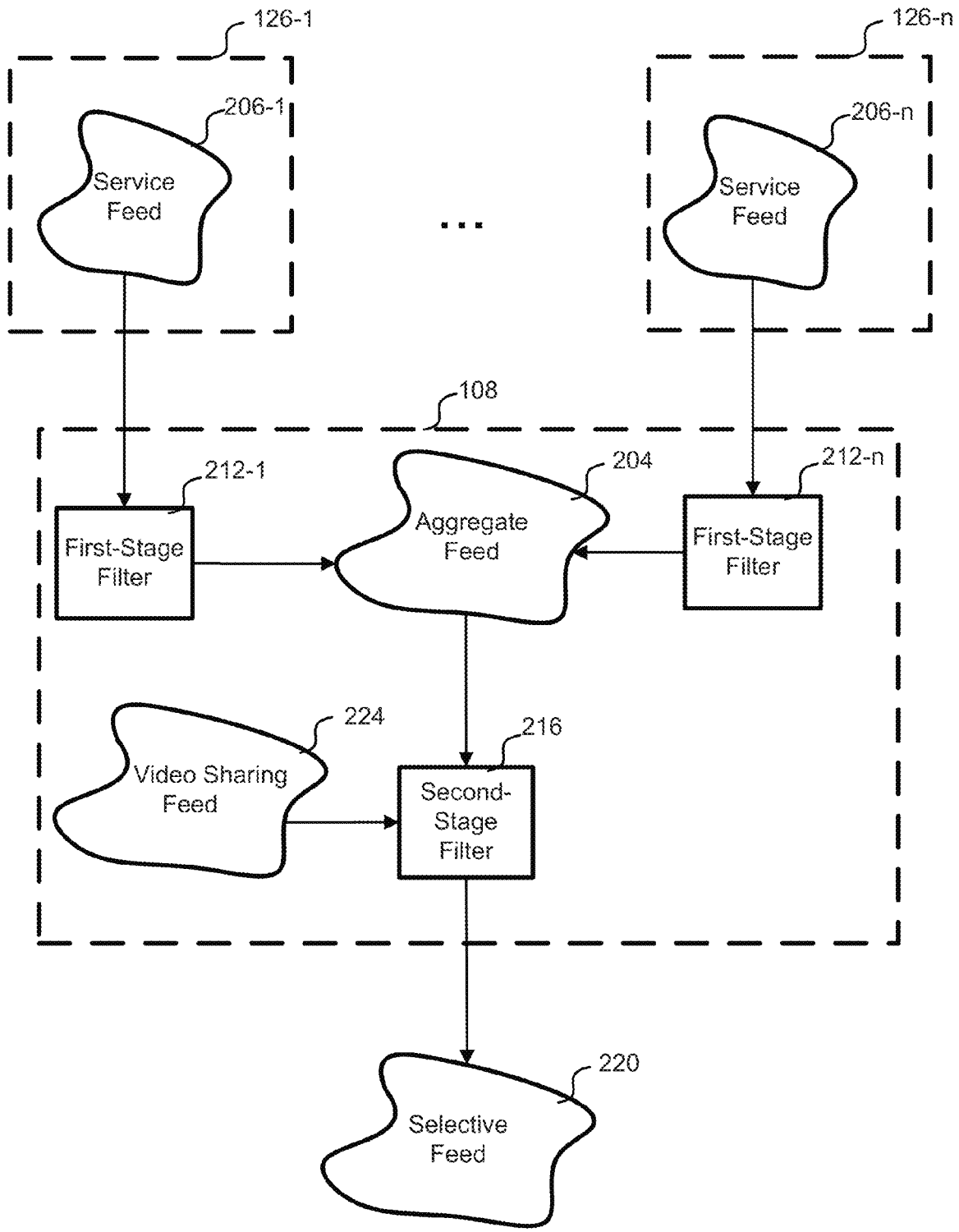

With reference to FIG. 2C, another embodiment of a diagram showing creation of a selective feed 220. In this embodiment, the selective feed 220 is a function of a video-sharing feed 224 formulated by another user and an aggregate feed 204 designed by the user. A second-stage filter takes the combination and may select in, or filter out, certain parts of the feed based upon a criteria specified by the user. The selective feed 220 could include any number of video-sharing feeds for optionally combining with an aggregate feed 204. The user could avoid specifying an aggregate feed 204 in other examples solely relying upon one or more video-sharing feeds 224 to create her selective feed 220.

In the primary embodiment, some service feeds 206 configured for aggregation may overlap (e.g., if a popular celebrity is followed on Twitter™ by more than one user of the system); in this case, the service feed 206 configured for aggregation is only obtained once, and can be simultaneously, synchronously, asynchronously, or discontinuously used (or re-used) as the basis for the other users 116 who also have configured that feed for aggregation. In this fashion, the aggregation system 108 of the primary embodiment is efficient in its use of resources and avoids duplicate or repetitive processing. Reuse may even be used where credentials are used by one user for a service feed 206 that will be used for another user.

In other embodiments, some or all of any overlapping service feeds 206 configured for aggregation are obtained separately for some or all users that have configured that service feed for inclusion in their aggregation feeds 204. Where credentials are required, service feeds 206 could be kept separate and retrieved in duplicate from the Internet service 126. Separation could be done in some embodiments regardless of whether credentials are required.

In the primary embodiment, optionally some service feeds 206 that a user 116 configures for aggregation can be provided by the Internet service 126 individually for that user 116, so that some or all users 116 who have configured that service feed 206 for inclusion in their aggregate feed 204 receive personalized, partially personalized, unique, partially unique, or potentially unique selective feeds 220 that are specific to them or that are created expressly for them. In the primary embodiment, the user 116 is identified via a user ID associated with the aggregated feed 204 that she provides to the aggregation system 108, and that the aggregation system 108 passes to the Internet service 126 of the service feed 206 to be aggregated, enabling that Internet service 126 to configure and return, or otherwise send, a service feed 206 customized for, or attributable in whole or in part to, that specific user 116. In this optional aspect of the primary embodiment, the user 116 also provides a password, so that the user 116 can be authenticated to the Internet service 126. In another embodiment, a password is not required.

In other embodiments, the user 116 is identified by any of, all of, or any combination of: a user ID, with or without a password; association with a specific device 112, device identifier, MAC address, or other attribute or data element associated with a device 112; association with a network address, network identifier, telephone number, or other attribute or data element associated with a network; association with content, a set of content, a pattern of content viewed, a content access characteristic, a set of content access characteristics, or a pattern of content access characteristics; association with a stored identifier, such as an Internet browser cookie, a Flash™ local shared object, or a similar file; association with a derived identifier, such as a device fingerprint comprising one or more aspects of the user's device and/or device software; association with biometric information; association with a usage pattern or characteristics; or association through another method of identifying a user or a user's association with a feed provider.

In the primary embodiment, while most service feeds 206 configured for aggregation are service feeds, additional feeds can optionally be configured for aggregation that provide data, sound, music, or other information, rather than video content, to the aggregation system 108. This data or other information can be used by the aggregation system 108 in the optional creation of algorithmically created, filtered, or alternatively sequenced feeds; for example, a data feed of a user's fantasy sports league rosters could be configured for aggregation, and the aggregation system 108 could then use the information it receives about the user's fantasy sports roster as a basis for identifying items for, filtering items contained within in, or alternatively sequencing the items in, the user's selective feed 220; in this optional embodiment, if and as the provided data or other information changed, the content of, filtering of, or sequencing of the items contained in the selective feed 220 would change accordingly.

Figure 3:
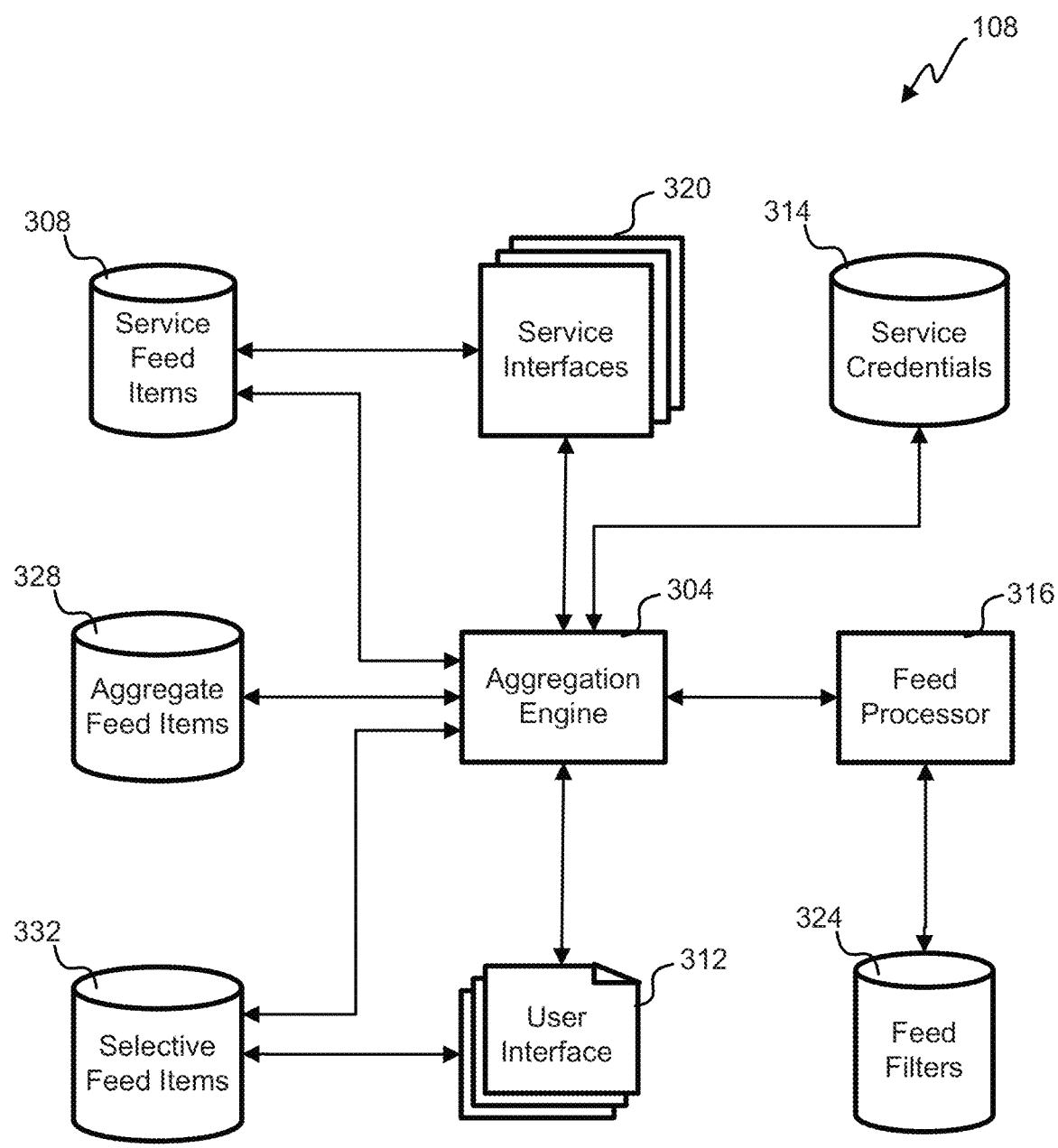
FIG. 3 depicts a block diagram of an embodiment of an aggregation system.

Referring next to FIG. 3, a block diagram of an embodiment of an aggregation system 108 is shown. There are various stores of information that may be in a database, file system and/or memory data structure, specifically, Service feed items 308, aggregate feed items 328, selective feed items 332, service credentials 314, and feed filters 324. The information in the various stores can be combined into a single store or divided between a number of stores at a number of locations. The aggregation system 108 includes application software running on one or more hardware servers in one or more locations.

The aggregation engine 304 manages processing of information within the aggregation system. Service interfaces 320 periodically check the various Internet services 126 for new Service feed items 308. Service credentials 314 are stored when and if the service credentials 314 are provided by users 116 and used by the service interfaces 320 where required by the Internet services 126. Service feed items 308 are processed and stored. In some cases, Service feed items 308 can be pushed to the aggregation engine 304 without the need to query for Service feed items 308 by the Internet services 126.

In another embodiment, one or more Internet services 126 send, transmit, or otherwise provide Service feed items 308 to the aggregation system 108, accessing an Application Programming Interface (API) or other interface mechanism to provide feed items, associated content, metadata, extracts or highlights, and any other information related to the service feed 206 or to individual Service feed items 308 in the service feed 206.

There can be first-stage filters 212 and second-stage filters 216 stored as feed filters 324. The feed processor 316 performs standard filtering to find appropriate feed items, but can also apply the first-stage 212 and second-stage filters 216 as specified by the users 116. The Service feed items 308 are organized by their source Internet service 126, category, subcategory, subject, topic or topics, tag or tags, genre, content rating, reviewer rating, popularity, and/or other factors. The aggregate feed items 328 are an aggregation from multiple service feeds 206 specified by a user after any feed filter 324 is applied by the feed processor 316. The selective feed items 332 are further filtered by the feed processor 316 using any second-stage filters 216.

Filters, including first-stage filters 212 and second-stage filters 216, or other filters, can be absolute or can be indicative of proportion or relative weight or degree, or can combine both. Thus, a filter applied to the aggregate or video sharing feeds 204, 224 of one user could completely block, or always include, inclusion in the selective feed 220 or a subset of the selective feed 220 those feed items 328, 332 matching the specified criteria, whereas the filter applied to the feed 204, 224 of a second user could operate to reduce the number of such feed items 328, 332, but not completely block such feed items 328, 332, or operate to increase the proportion of such feed items 328, 332, but not always include such feed items 328, 332, in the selective feed 220 or a subset of the selective feed 220 of that second user, and whereas the filter applied to the feed 204, 224 of a third user could operate to change the position or sequence of feed items 328, 332 matching the specified criteria in the selective feed 220 or a subset of the selective feed 220 of that third user. For example, in a user interface 312, such filters could be visually presented to a user as a "slider" bar, where the far left position means "always include," the far right position means "always exclude," and positions between the far left and far right mean graduated degrees of inclusion, importance, or priority.

Once a service interface 320 has found a Service feed item 308, it is processed to determine included video or content link, feed service source, description of the video or content, any reviews or rankings, user comments, related article(s) etc. In the various stages of processing, all the information that comprises the Service feed item 308 need not be replicated. The aggregate feed 204 can be a list of identifiers that specify which Service feed items 308 to include. Similarly, the selective feed can be a list of the Service feed items 308 that have not been filtered out and are specified for inclusion for one or more users 116.

The user 116 interacts with a user interface 312 to configure the aggregation system 108. An account is created through the user interface 312 where service feeds 206 are specified, filtering, credentials, etc. Additionally, the user 116 can authenticate herself with the aggregation system 108, for example, with a user name and password or with other credentials. Content pages are supplied through the user interface 312 to display the selective feed items 332. The selective feed items 332 can be organized by oldest items, newest items, most highly reviewed, popularity, unviewed items, or any other criteria or combination of criteria. The user interface 312 may be supplied by the aggregation system 108, implemented in an application, applet or app on the rendering system 112, or divided in implementation between the aggregation system 108 and rendering system 112 in various embodiments.

Figure 4A:
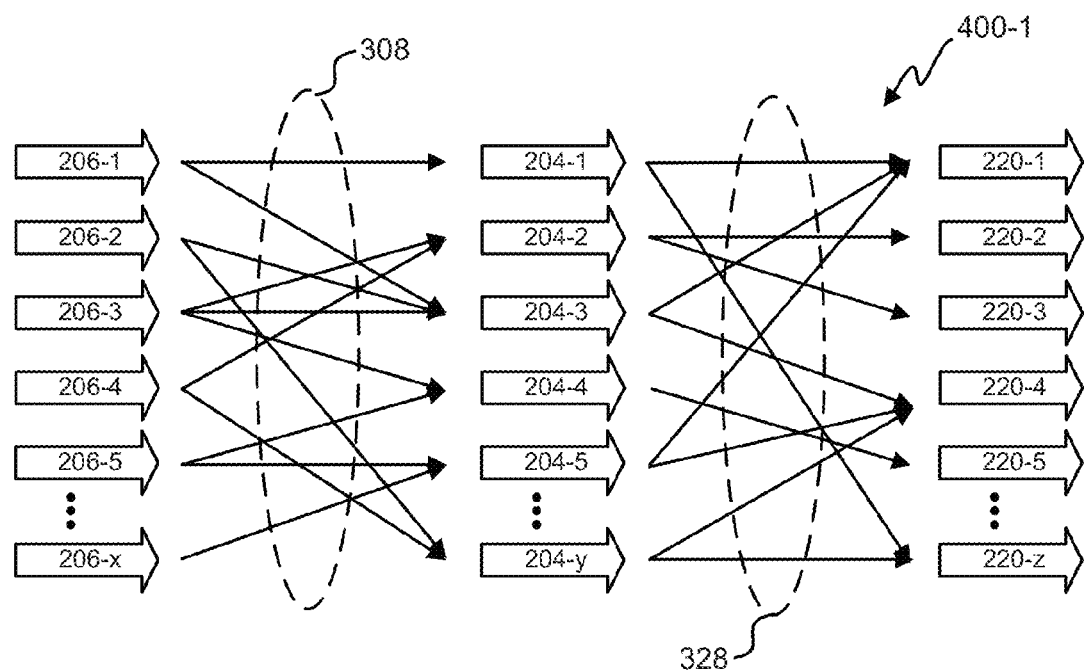
FIGS. 4A and 4B depict diagrams of embodiments that illustrate the logical flow of feeds.

Referring next to FIG. 4A, a diagram 400-1 of an embodiment illustrating the logical flow of feeds is shown. In this embodiment, there are x service feeds 206, y aggregate feeds 204 and z selective feeds. The arrows show how service feeds 206 are typically logically combined into aggregate feeds 204 and optionally logically combined into selective feeds 220. For example, a first service feed 206-1 is the sole contributor to a first aggregate feed 204-1. The first, third and fifth aggregate feeds 204-1, 204-3, 204-5 are identified by the user 116 to be combined into the first selective feed 220-1. In another example, the third and fifth service feeds 206-3, 206-5 combine into the fourth aggregate feed 204-4 before being the sole contributor to the fifth selective feed 220-5.

Figure 4B:
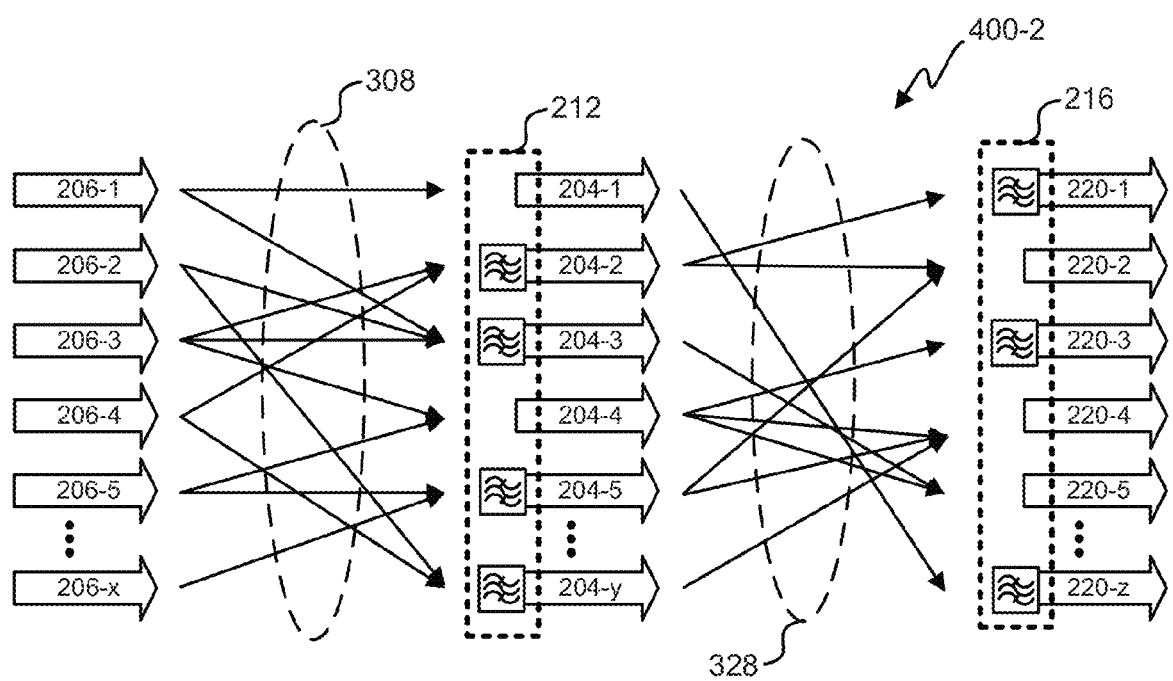

With reference to FIG. 4B, a diagram 400-2 of an embodiment illustrating the flow of feeds is shown. This embodiment adds user-defined filtering through first-stage filters 212 and second-stage filters 216. These filters are in addition to standard filters that screen for feed items that are of a particular type, for example, video feed items are screened to exclude items that have no video. In one example, the fifth service feed 206-5 is provided to fourth and fifth aggregate feeds 204-4, 204-5. A first stage filter 212 on prior to the fifth aggregate feed may select for, or screen out, any Service feed items 308 relating to a particular subject or with a particular characteristic, for example, HD video or with a keyword or tag of "Charlie Sheen". In another example, the second aggregate feed 204-2 is provided to both the first and second selective feeds 220-1, 220-2 with only the second selective feed 220-2 filtering the input aggregate feed items 328.

Figure 5:
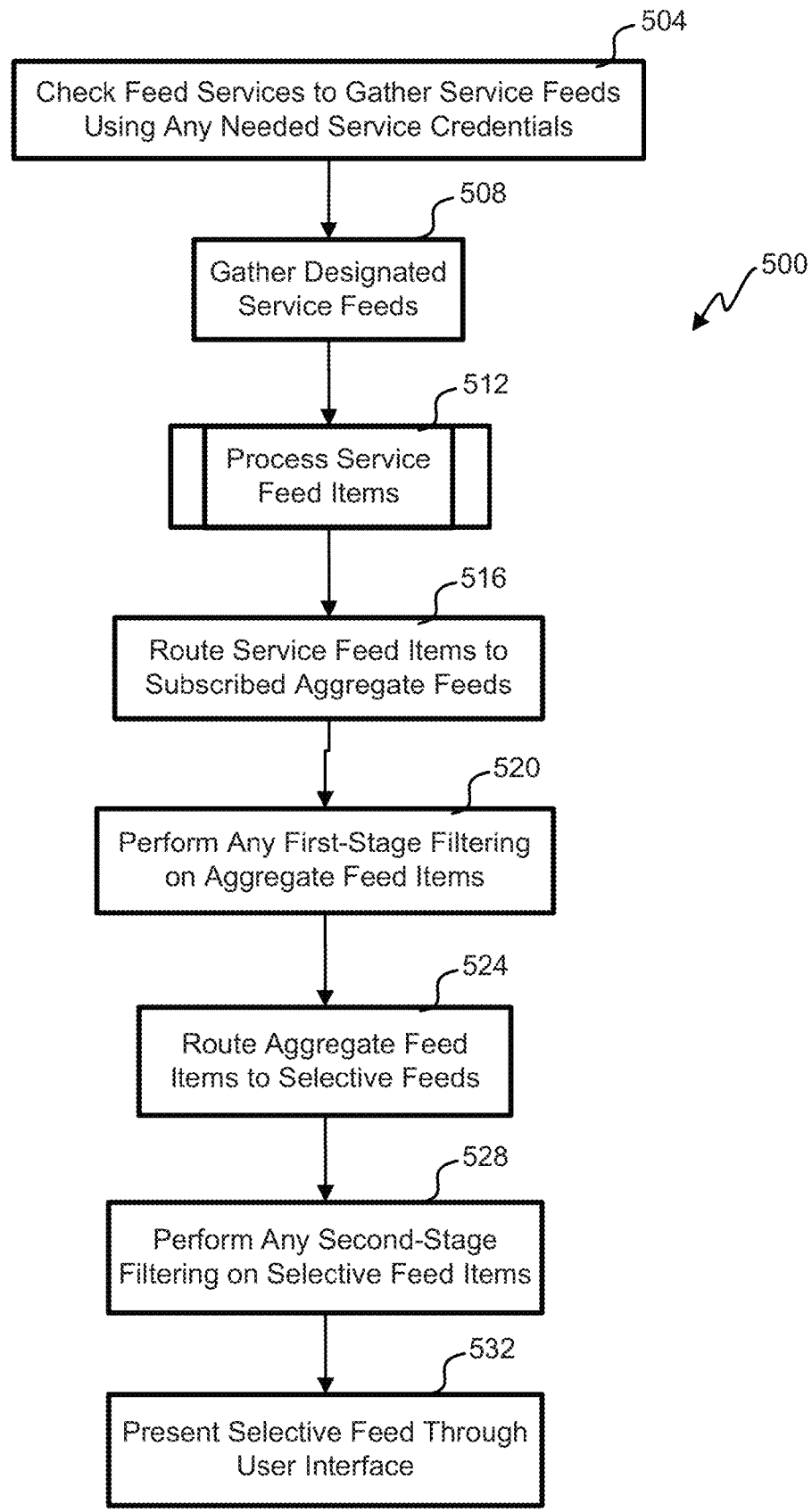
FIG. 5 illustrates a flowchart of an embodiment of a process for gathering feed items.

Referring next to FIG. 5, a process 500 for gathering feed items is shown for the primary embodiment. The depicted portion of the process begins in block 504 where the service interfaces 320 gather Service feed items 308. Any needed service credentials 314 are used to get access to the service feeds 206. In block 508, the service feeds 206 chosen by the various users are gathered by the service interfaces 320. Each service feed 206 could be checked periodically for new Service feed items 308. Processing is performed on the Service feed items 308 in block 512.

Various users 116 have subscribed to the various service feeds 206. In block 516, the processed Service feed items 308 are routed to the subscribed aggregate feeds 204. Any first-stage filter 212 specified by the user is performed on the Service feed items 308 before they become part of the aggregate feed 204 in block 520. The aggregate feed items 328 are routed to selective feeds 200 that have subscribed in block 524. Any second-stage filter 216 is applied on the selective feed items 332 in block 528. The user 116 periodically will access the aggregation system 108 to view the selective feed 220 through the user interface 312 or the device 112.

Figure 6:
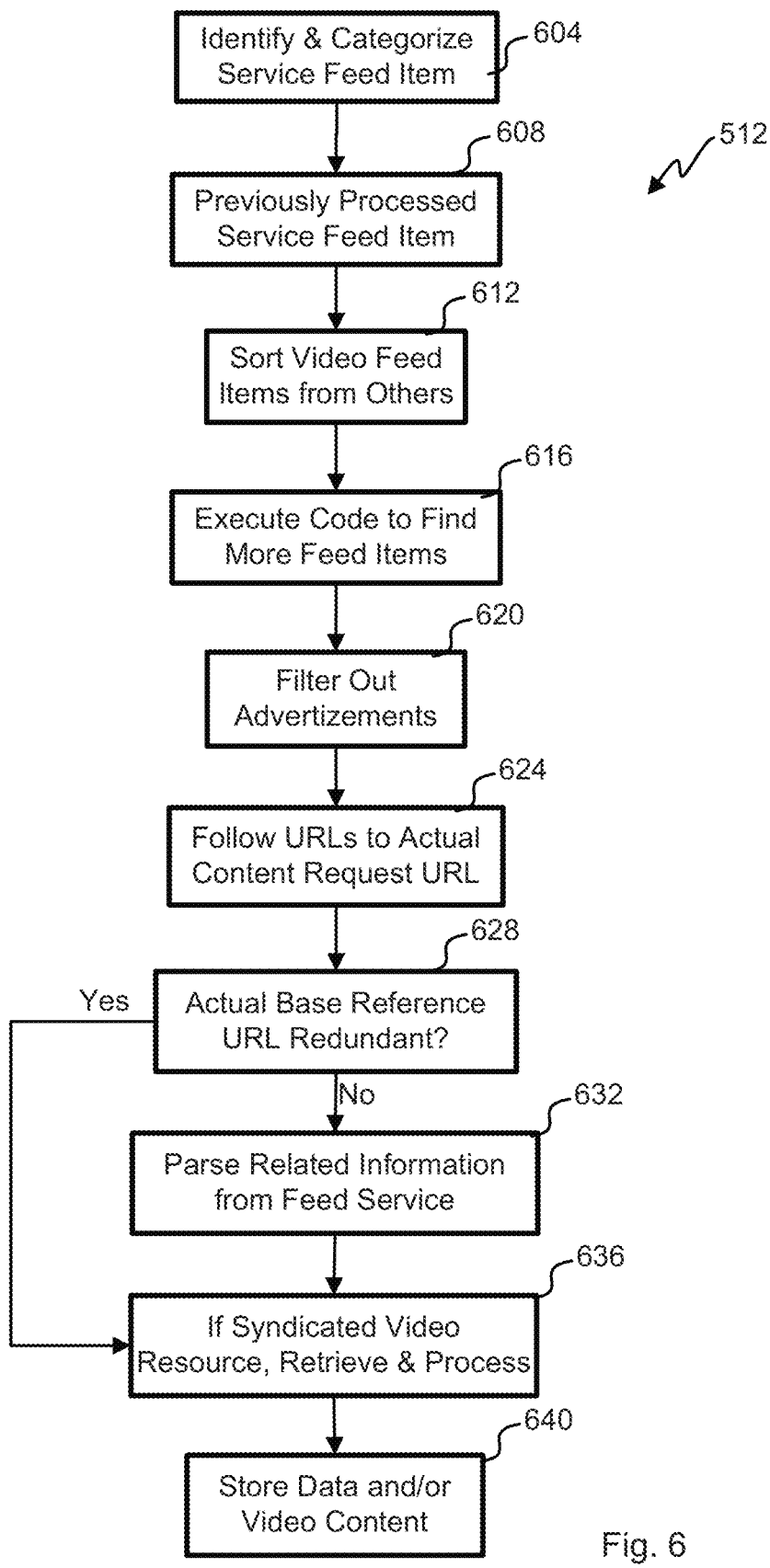
FIG. 6 illustrates a flowchart of an embodiment of a process for processing a service feed.

With reference to FIG. 6, a process 512 that fixes the service feed 206 is shown. The aggregation system 108 determines whether an aggregate feed item 328 from an aggregate feed 204 is itself, or references or includes within it, video content, and if the aggregate feed item 328 is or does, processes the aggregate feed item 328, by any of, some of, or all of the following blocks, depending on the requirements presented by the aggregate feed item 328 from the service feed 206, and executed in any order as determined by the requirements presented by the aggregate feed item 328. The depicted portion of the process 512 begins in block 604 where the aggregation engine 304 identifies and categorizes the Service feed item 308 and extracts available characteristics of the Service feed item 308, e.g. any available identifying, classifying, temporal, or system-related characteristics of the Service feed item 308.

In block 608, the aggregation engine 304 determines whether the Service feed item 308 has been previously processed, and if it has, how recently and in what context. Next, it is determined whether a Service feed item 308 is itself a video resource. The aggregation engine 304 determines whether a Service feed item 308 that is not a video resource is a web page, RSS feed, XML file, or other data type that potentially contains within it URLs that are video resources or that iteratively require further processing in block 612. Embedded executable code contained within the resource is executed in block 616, such as Javascript™ contained with a web page, to obtain content that is normally activated within that resource by a browser or other software client's execution of such embedded executable code, and further processes the content thereby obtained. In block 620, it is determined whether a video resource URL or other resource URL is content, or is a URL for an advertisement (either video or non-video); and if it is a URL for an advertisement, ignores it.

Optionally, a module or function of the aggregation engine 304, or a separate system or module associated with the aggregation engine 304, may repetitively access, execute, download, or otherwise activate all of or part of a service feed item 308, web page, web page element, URL, <video> tag, other tag, embed code, other content container, or other content indicator, identifying itself as a different user agent, device type, media player type, or other component type, and/or within same identifying itself as having different functions, capabilities, connectivity, characteristics, or capacities at each such access, execution, download, or activation, in order to receive multiple alternative responses indicating alternative formats, protocols, structures, policies, or other characteristics that may be available. Where multiple such alternative responses are available, the module or function of the aggregation engine 304, or separate system or module associated with the aggregation engine 304, may store some or all of the alternative responses and optionally some or all of the options associated with some or all of the accesses, executions, downloads, or activations associated with the responses.

A URL in a Service feed item 308 can be redirected and/or rewritten when activated. In block 624, it is determined whether a URL is a shortened URL, and if it is, issues an HTTP (or other appropriately formatted request) for that URL to obtain the actual base reference URL for further processing. It is determined whether the base reference URL has previously been processed in block 628, and if it has, determines whether a modification, creation, or expiration date parameter is associated with the base reference URL, and if one is available, determines whether it indicates that the resource identified by the base reference URL has been changed, or has not been changed, since the base reference URL was previously processed. Where the base reference URL was not previously processed, the aggregation engine 304 parses the surrounding resource to obtain metadata, such as dates, times, proper names, and other metadata, that is potentially relevant to, associated with, or descriptive of, the video resource in block 632. The aggregation engine 304 optionally parses the surrounding resource to obtain user comments, "likes," ratings, and other user feedback or other content. The aggregation engine 304 optionally associates data obtained from the surrounding resource with the base reference URL or base video object, in order to aggregate data obtained from multiple surrounding resources in which a particular base reference URL or base video object appears.

Where a base reference URL is available for the URL, such as may be the case for syndicated content, the aggregation engine identifies whether a base reference video object is available for a video resource identified by a URL. In block 636, a syndicated video resource that has not been previously stored, is stored. Optionally, one or more short highlights of the video object are extracted and stored; in the current implementation of the primary embodiment, a single 15 second highlighted is extracted and stored. Optionally, the video resource, the extracted highlight(s), or both (all) are transcoded or otherwise processed into one or more other formats, codecs, bitrates, containers, or forms. The aggregation engine stores and associates the data and objects obtained via this process 512, keyed at least by the item processed and by the video resource as a service feed item in block 640.

In the primary embodiment, the aggregation system 108 optionally eliminates duplicate video items (i.e., items that appear in more than one of the service feeds 206 aggregated for one or more users 116), while preserving the selective feed item's 332 presence in any of the selective feeds 220, or any of the filtered or narrowed views of any of the selective feeds 220. In the primary embodiment, the user 116 can also add a resource or item to the aggregation system 108, so that the video will be included in the user's aggregate feeds 204 and processed to derive the user's selective feed 220, by providing the resource's URL, embed code, or other identifier to the aggregation system 108; that item is processed as if it were an item obtained from a service feed 206.

In an optional aspect of the primary embodiment, some Internet services 126 are blocked by the aggregation system 108, so that a user 116 cannot configure such Internet service 126 for aggregation, cannot add an Internet item 308 associated with that Internet service 126 to the aggregation system 108, or otherwise designate content from that Internet service 126 for incorporation into the aggregation system 108; this optional aspect of the primary embodiment can be configured to prevent the aggregation system 108 from accessing and/or incorporating content associated with, or obtained from, Internet services 126 that have been identified as being Internet services 126 that consist partially, predominately, or entirely of content that is undesirable, prohibited, illegal, pirated, unlicensed, copied, or otherwise objectionable. In another embodiment of this optional aspect, some Internet services 126 are blocked by the aggregation system 108 for some users 116, based on criteria associated with users 116 or rendering devices 112, or other criteria. In another embodiment of this optional aspect, some or all Internet services 126 are configured for content review and each feed item 332 (including related or associated content) is inspected for a digital watermark, digital fingerprint, audio content match, or other content match to determine whether the specific feed item 332 and its related or associated content is permitted or blocked.

Figure 7A:
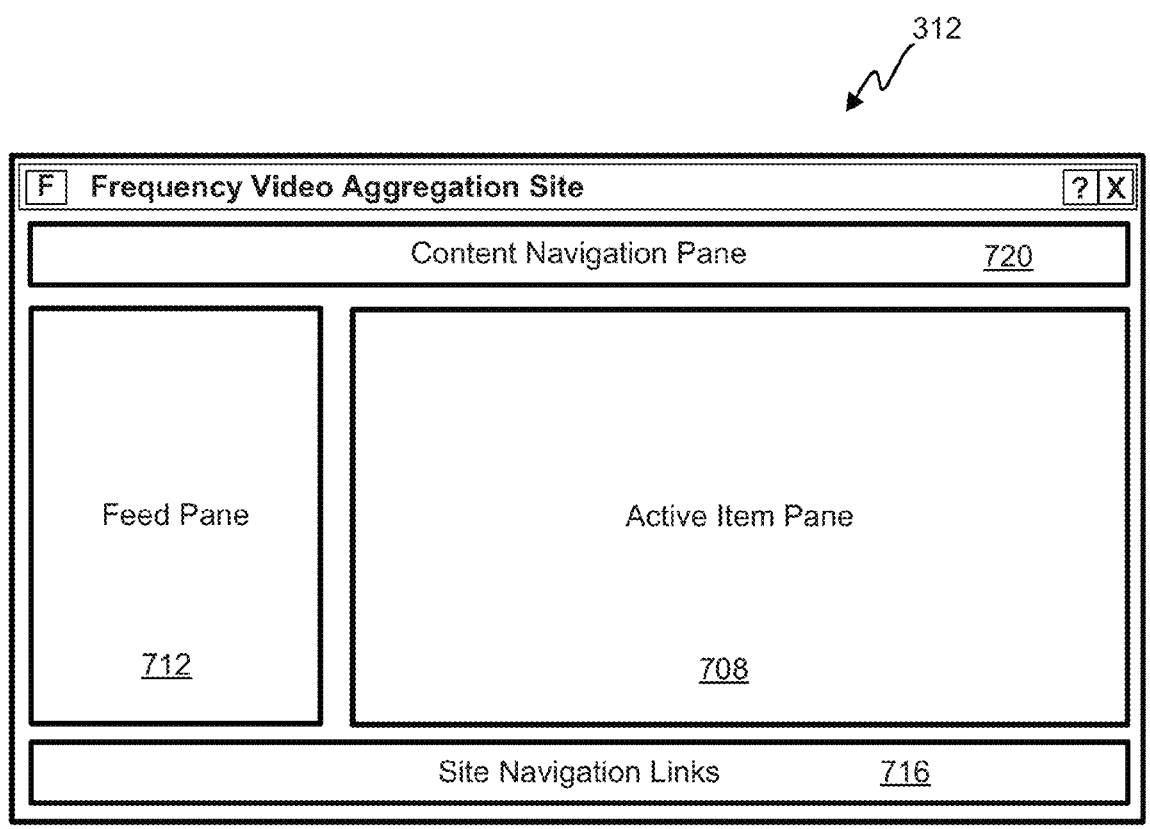
FIGS. 7A, 7B and 7C depict an embodiment of a user interface to the aggregation system.
Figure 7B:
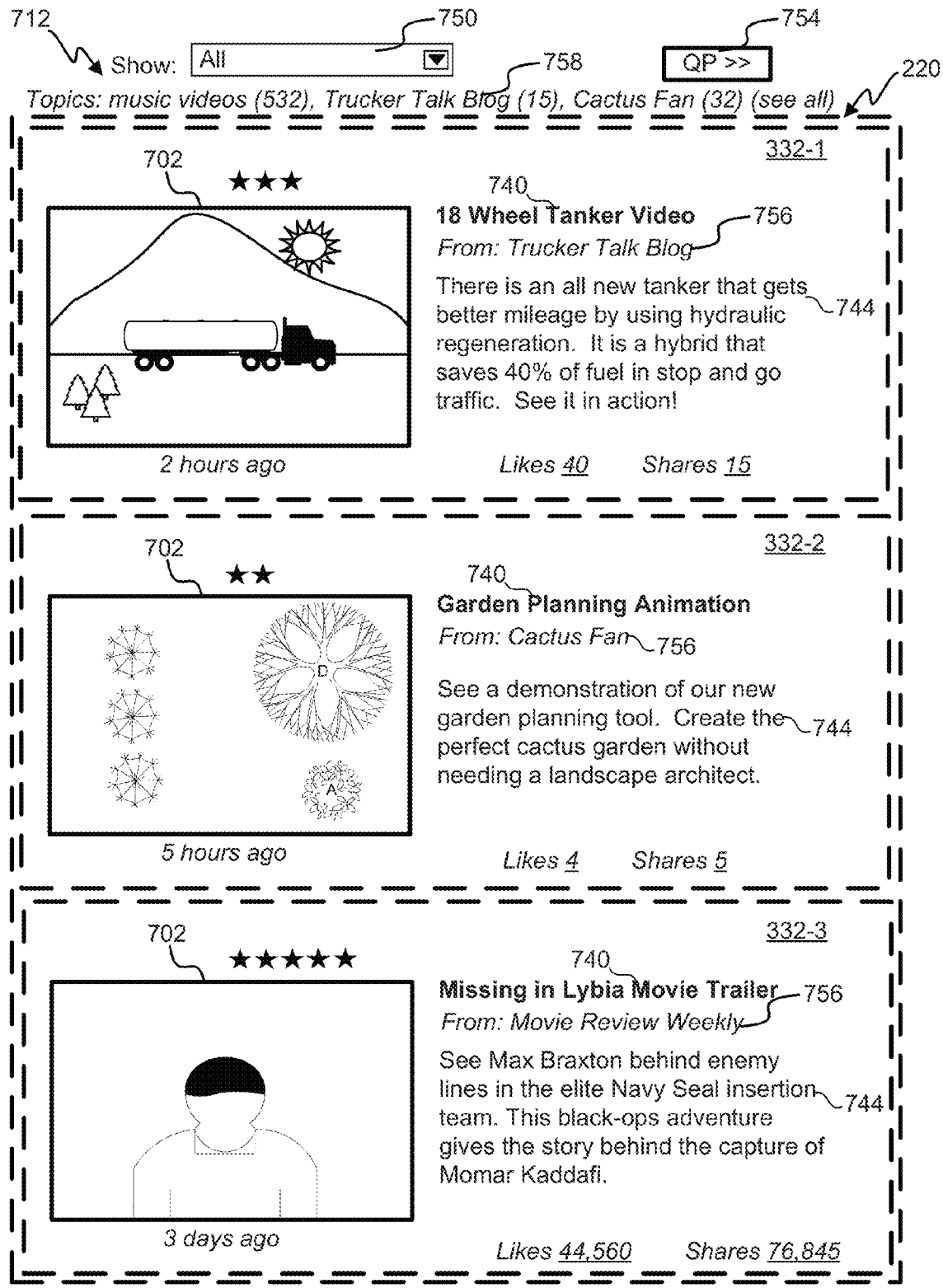
Figure 7C:
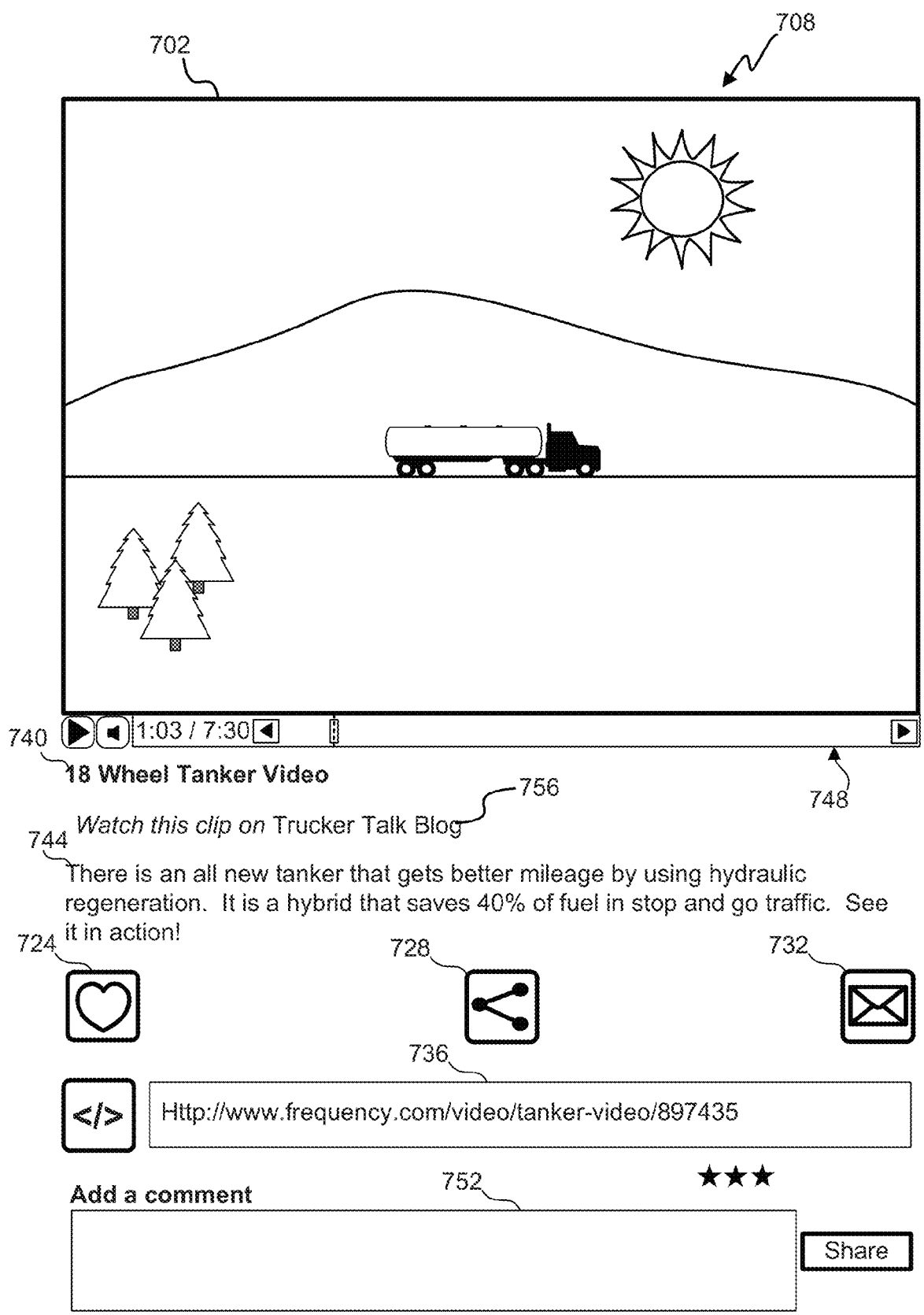

Referring next to FIGS. 7A, 7B and 7C, an embodiment of a user interface 312 to the aggregation system 108 is shown. In the primary embodiment, the user interface 312 for a full screen (as opposed to mini) browser-based user 116 who is recognized by the aggregation system 108 comprises a content navigation pane 720 with navigational and other controls across the top of the screen, a presentation of the user's selective feed running in a feed pane 712 beneath the content navigation pane 720 and down the left side of the screen, an active item pane 708 for video playback underneath the overall controls on the right side of the user interface 312, an information display showing information (i.e., title 740, source 756 and description 744) about the video underneath the video window 702, and a comment entry field 752 and sharing controls 724, 728, 732 beneath the information display.

In an optional aspect of the primary embodiment, a user interface 312 for a full screen browser-based user is a video playback window 702 embedded in a web page published by a party other than the primary embodiment aggregation system 108. The embedded user interface 312 could also include a feed pane 720 and/or a content navigation pane 720. Other embodiments could include a feed pane 712 that is overlaid or replaced by a video playback window 702 when one selective feed item 332 is chosen.

In another optional aspect of the primary embodiment, one or more data elements or types related to each selective feed item 332 is presented from some or all of the Internet services 126 associated with the service feeds 206 in which the selective feed item 332 was found, for example, ratings, comments, "likes," shares or other such information about a selective feed item 332. In yet another optional aspect of the primary embodiment, one or more data elements or types related to each selective feed item 332 is consolidated from some or all of the Internet services 126 associated with the service feeds 206 in which the selective feed item 332 was found, for example, "likes" or shares of a feed item 332 are aggregated from multiple Internet services 126, or ratings of a feed item 332 are averaged or otherwise mathematically consolidated from multiple Internet services 126.

In another optional aspect of the primary embodiment, the user interface 312 and controls are adapted to the display characteristics and data input/output capabilities of an Internet-connected television, with the video playing in the full screen, or nearly the full screen, of the television display with translucent information related to the video displayed over the video as the video playback window 702 starts and then fading-out after several seconds to provide unimpeded visual access to the video; controls, such as "skip to the next video" or "bring up the selective feed," are executed via pressing keys on the television remote. In some cases, a playback manipulation control 748 would overlay the video playback window 702 translucently when temporal manipulation of playback is performed and fade away after manipulation.

In another optional aspect of the primary embodiment, the user interface 312 and controls are adapted to the display characteristics and data input/output capabilities of an Internet-connected smartphone or tablet, with the video playback window 702 playing in the full (albeit, in at least some cases, physically small) screen, or nearly the full screen, of the smartphone or tablet, with information 740, 756, 744 related to the video displayed over the video as the video starts and then fading out after several seconds to provide unimpeded visual access to the video; controls, such as "skip to the next video" or "bring up the selective feed," are executed via gestures made by touching the screen, or by pressing keys on a soft keyboard invoked to appear on the screen, or by pressing physical keys on the smartphone or tablet.

In another optional aspect of the primary embodiment, the user interface 312 is split between two display screens, implemented as either two display screens embedded in a single device or as two separate devices. A first display screen could be a television with the video playback window 702 being supplied by internal circuitry or a set top box. A second display screen would be used to provide the feedback pane 712, content navigation pane 720, content information 740, 756, 744, playback manipulation control 748, comment entry field 752, sharing controls 724, 728, 732, and/or embedded link control 736. The second display screen could be an intelligent remote control, a smart phone, a PDA, a personal computer, a tablet computer, etc. Communication could be directly from the second display screen to the first display screen or through an intermediary such as a set top box or through the aggregation system 108.

In another embodiment, the interface 312 comprises multiple columns of selective feed items 332, all of which may be sorted according to the same criteria, or some or all of which may be sorted according to separate criteria, implemented as multiple feed panes 712 or as multiple columns of information in a single feed pane 712. In this embodiment, one or more feed panes 712 would compress, dissolve or fade, shift to another position, or otherwise visually give way to the active item pane 708 when a selective feed item 332 is selected for playback.

In the primary embodiment, the selective feed 220 is presented to the user 116 in reverse chronological timeline sequence, that is, with the most recent item first (e.g., at the top of a list of items) as shown in FIG. 7B. In other embodiments, the selective feed 220 is presented to the user 116 in chronological timeline sequence; in modified reverse chronological timeline sequence where selective feed items 332 are grouped together, the selective feed items 332 within groups 758 are presented in chronological timeline sequence and the groups 758 are presented in reverse chronological timeline sequence; in modified chronological timeline sequence where selective feed items 332 are grouped together, the selective feed items 332 within groups 758 are presented in reverse chronological timeline sequence and the groups 758 are presented in chronological timeline sequence; or in a sequence determined without regard to time order. Optionally, the selective feed 220 may also be presented in one or more filtered or alternative sequences, for example any of, all of, or any combination of:

- in reverse chronological or other sequence, filtered with a feed filter 324 to show only the selective feed items 332 from a particular aggregate feed 204 or topic 758 (e.g., the user's Twitter™ feed, Facebook™ feed, music video feed, etc.), or only the selective feed items 332 associated with a particular entity within a service feed 206 (e.g., a particular Twitter™ entity followed by the user), or only the selective feed items 332 from a particular source (e.g., BBC News™), or only the selective feed items 332 that are associated with a particular topic, metadata tag, proper name, or other identifier or attribute;
- in reverse chronological or other sequence, filtered to show only the selective feed items 332 from one or more particular categories 750 (such as News, Sports, Celebrities, or Finance); or, within that category 750, in reverse chronological or other sequence, filtered to show only the selective feed items 332 from a particular aggregated feed 204, or only the selective feed items 332 associated with a particular entity within a selective feed 220, or only the selective feed items 332 from a particular source, or only the selective feed items 332 that are associated with a particular topic, proper name, or other identifier or attribute;
- in a sequence, determined entirely or in part by one or more algorithms, and based on any of, all of, or any combination of: filtering out duplicate, nearly duplicate, loosely duplicate, repetitive, nearly repetitive, or loosely repetitive selective feed items 332; identifying more or less popular, or more or less relevant, selective feed items 332 as determined by the total user population or by a subset of the user population, based on the viewing (including started views, partially completed views, completed views, and/or repeated views), liking, sharing, saving, and other behavior of the other users or subset of users, and where the subset is optionally affiliated with, socially connected to, comparable to, loosely or closely temporally coincident with, associated through actual, geographic, or network location with, directly or indirectly linked to, or otherwise related to the user, or unrelated to the user;
- in a sequence, determined entirely or in part by one or more algorithms, and based entirely or in part on the selective feed items 332 chosen based on the user's current or past actions or behavior, including any of, all of, or any combination of: the user's service feed 206 subscriptions; the specifics of the user's service feeds 206; the user's viewing behavior, including started views, partially completed views, completed views, and/or repeated views; the user's likes, shares, saves, and saves for later viewing; the user's search or other queries; the user's added resources and items; the user's actions or behavior associated with a device or devices 112, category of devices, or attribute(s) or characteristic(s) of a device or devices 112, or based on or associated with the user's comparative actions or behavior associated with a device or devices 112, category of devices 112, or attribute(s) or characteristic(s) of a device or devices 112 as compared to the user's actions or behavior associated with another device or devices 112, category of devices 112, or attribute(s) or characteristic(s) of a device or devices 112; and/or other user actions, inactions, or behavior(s);
- in a sequence, determined entirely or in part based on information contained in: one or more non-video link service feeds associated with the user, or determined entirely or in part by one or more algorithms based entirely or in part on information contained in one or more non-video link service feeds associated with the user; or Service feed items 308 that do not link to video content;
- in a sequence determined entirely or in part by one or more algorithms that increases, decreases, achieves a minimum, or limits the maximum of, the number of consecutive Service feed items 308 and/or the proportion of Service feed items 308 within an overall range or group of Service feed items 308, from one source or service feed 206, or from a group of sources or service feeds 206, or from a type or category of sources or service feeds 206, or with one or more other attributes;
- including or excluding selective feed items 332 in a user's selective feed 220 based, entirely or in part, on any of, all of, or any combination of: determining whether the selective feed items 332 have been included in the selective feed 220 of another user with whom the first user has a relationship on one or more social networks, such as a friend relationship, a following relationship, or another social network relationship or connection; the level of the user's usage, sharing activity, rating activity, commenting activity, or other activity or usage, on the aggregation system 108, or on one or more social networks, or on one or more other digital systems, or any combination of some or all; characteristics, including Service feed item 308, service feed 206, category 750, device 112, temporal, or other characteristics, of the user's usage, sharing activity, rating activity, commenting activity, or other activity or usage, on the aggregation system 108, or on one or more social networks, or on one or more other digital systems, or any combination of some or all; one or more aggregated, subdivided, or cross-referenced user(s) or group(s) of users within whose selective feeds

220 that the selective feed items 332 have been included into; one or more aggregated, grouped, subdivided, categorized, allocated, identified, calculated, ranked, or cross-referenced Internet services 126, Internet service feeds 206, and/or individual or group(s) of user selective feeds 220 that contain or do not contain, reference or do not reference, refer to or do not refer to, indicate or do not indicate, or otherwise signal one or more selective feed items 332, at a point in time, over a period of time, based on one or more other time-related characteristics, and/or without respect to time; previous viewing of, sharing of, rating of, or other usage of other selective feed items 332; previous viewing of, sharing of, rating of, or other usage of other selective feed items 332 included within the user's selective feed 220, whether similarly included, arbitrarily included, or otherwise included; one or more algorithms designed or intended to maximize the individual or aggregate viewing of, sharing of, rating of, or other usage of the included selective feed items 332, of other selective feed items 332, of other selective feeds 220, of the aggregation system 108, or of the device 112, immediately, over time, without respect to time, or otherwise. For example, a selective feed 220 from a user's social networking account could exclude or include feed items 332 from a particular friend, tagged with a particular keyword, or excluded based on any other criteria to create a keyword feed item. For another example, a selective feed 220 or an Internet service feed 206 could be filtered and/or ordered based on how many times the selective feed items 332 or other feed items were shared by all users of a certain social networking service, some users of all social networking services, other users with whom a user has a relationship on one or more social networking services, other users with whom a user does not have a relationship on one or more social networking services, a particular group of users on a social networking service (e.g., the most commonly followed users, users who most commonly share media items, or users determined by some other means to be particularly influential, predictive, or knowledgeable), or another superset of, or subset of, users of one or more social networking services; and/or including or excluding selective feed items 332 in a user's selective feed 220 based, entirely or in part, on any of, all of, or any combination of: data obtained from the user's device 112, such as location, calendar data, stored media data, other installed programs; data obtained from a service associated with the user's device 112, or with another device 122 associated with the user; data obtained from an Internet service 126 associated with the user 112.

In the primary embodiment, the videos are played sequentially in the order in which they are presented to the user 116 in the selective feed 220, and if the selective feed 220 is presented in a filtered or narrowed ordered, then in that filtered or narrowed sequence. Thus, in the primary embodiment and on a full screen browser-based user interface 312 (e.g., a PC), the user can see the selective feed 220 on the left in a feed pane 712, which feed item 332 is currently playing, which feed item(s) 332 recently played, and which items are coming up for playback with the feed items 332 arranged in the feed pane 712 as a vertically-rotating carousel. In the primary embodiment, each item in the running selective feed 220 presented on the left hand side feed pane 712 of the screen portraying the user interface 312 contains descriptive information about the item, such as the title 720, description 744, source 756, number of likes and shares, optionally other rating information, and optionally other information; this enables the user to see such information about feed items 332 not currently playing in the video playback window of the active item pane 708. The user 116 can manually select feed items 332 within the selective feed 220 as presented, typically by pointing and clicking on a feed item 332, at which point the feed item 332 begins playing in the video playback window of the active item pane 708, which allows the user 116 to directly access any feed item 332 on demand and begin playback as the feed items 332 are rotated through a list of the selective feed 220 arranged in a vertical carousel within the feed pane 712. The user 116 can also select the next sequential video in the list of the selective feed 220 by clicking on a button or slider control that advances playback to the next feed item 332, which stops playback of the current feed item 332 and begins playback of the next feed item 332 in sequence. At the conclusion of any feed item's 332 playback, when playback of that feed item 332 reaches the end, the next feed item 332 in sequence automatically begins playback in one embodiment. Other embodiments could use a Play control to begin playback of the next feed item 332 after the current feed item 332 is done playing.

In an optional aspect of the primary embodiment, automatic sequential playback continues indefinitely, until the end of the selective feed 220 is reached; in this manner, a very long continuous period of video content playback—hours, days, weeks, months, limited only by the length of the history of the user's selective feed 220—can in principle be offered to the user 116, with as much or as little action, and resulting control, as the user desires. In another aspect of the primary embodiment, automatic sequential playback is paused or stopped by the aggregation system 108 after a predetermined point or range, based on a number of videos played, a total time amount of video played, a time interval that has elapsed since the last user-initiated action, the age of an item in the user's selective feed, or other criteria; automatic sequential playback may then be resumed upon user initiation or if the user responds to a prompt or system request or dialogue.

In an optional aspect of the primary embodiment, the user 116 can perform one or more of the following actions for some or all of the feed items 332 in her selective feed 220:

"Like" a feed item, which marks it as a feed item she liked;

rate a feed item, which marks a feed item with her rating, which may be positive or negative or either, and which may have any range desirable, such as a scale of stars;

save a feed item, which marks it as a feed item she has saved;

save a feed item for later viewing, which marks it as a feed item she has saved and would like to view again, including on a different device 112, and including on a specific device or group of devices 112;

automatically save feed items, including any variation or specific method of saving feed items, based on criteria she specifies, such as any of, all of, or any combination of, feed items from one or more selective feeds, feed items associated with one or more users or sources, feed items associated with one or more topics or categories of topics, length of feed item, content of feed item, category of feed item, or other feed item attributes;

manually or automatically terminate the saving of a saved feed item, including based on any of, all of, or any combination of elapsed interval since saved, elapsed interval since last viewed, elapsed interval since last shared or liked, elapsed interval since last action by another person associated with the user, selective feed(s) associated with the feed item, user(s) associated with the feed item, sources associated with the feed item, topics or categories of topics associated with the feed item, length of feed item, content of feed item, category of feed item, or other item attributes;

share a feed item with other users of the aggregation system, or to users of one or more other Internet services (which may require that she provide her user credentials for that system, if she has not already provided them), or both, or otherwise send feed items to other users of either the aggregation system or another Internet service or both;

automatically share selective feed items 332, including any variation or specific method of sharing selective feed items 332, based on criteria she specifies, such as any of, all of, or any combination of, selective feed items 332 she has liked, saved, stored, or rated, selective feed items 332 from one or more selective feeds 220, selective feed items 332 associated with one or more users or sources, selective feed items 332 associated with one or more topics or categories of topics, length of feed item, content of feed item, category of feed item, rating of feed item, or other feed item attributes;

store a selective feed item 332 to one or more devices 112, so that some or all of the content associated with that selective feed item 332, including or excluding the video content, can be viewed on that device 112 when not connected to the aggregation system 108;

automatically store selective feed items 332 to one or more devices 112, including any variation or specific method of storing selective feed items 332, based on criteria she specifies, such as any of, all of, or any combination of, selective feed items 332 she has liked, saved, shared, or rated, selective feed items 332 from one or more selective feeds 220, selective feed items 332 associated with one or more users or sources, selective feed items 332 associated with one or more topics or categories of topics, length of feed item, content of feed item, category of feed item, rating of feed item, or other feed item attributes;

comment on a feed item;

send a message in conjunction with sharing a feed item;

provide feedback to the publisher of a feed item;

place an order related to a feed item;

accept an offer provided in conjunction with a feed item;

delete a feed item from her selective feed; and/or reverse or revoke any previous action.

In an optional aspect of the primary embodiment, the sequence of feed items 332 upcoming in the user's selective feed 220 shown in the feed pane 712 is dynamically influenced, changed, or rearranged based on the user's actions as the aggregation system 108 progresses through the selective feed 220 as originally sequenced for the user 116 in the vertical carousel. For example, as previously described, in the primary embodiment the sequence of the feed items 332 in the selective feed 220 is reverse chronological timeline sequence (which in this optional aspect may be considered the original sequence of feed items 332); as the aggregation system 108 proceeds through the playback process and the user 116 watches, skips, likes, saves, or shares items in the selective feed 220, in this optional aspect of the primary embodiment the aggregation system 108 dynamically adjusts the sequence of upcoming feed items 332 in the user's selective feed 220 to reflect these actions so that the user 116 sees more items that share various characteristics with the feed items 332 she has liked or shared or saved for later viewing, or fewer items that share various characteristics with the feed items 332 she has skipped or deleted, or otherwise re-sequences the upcoming feed items 332 in the selective feed 220 based on her actions. This process can be iteratively repeated based on the user's actions as the aggregation system 108 progresses through the adjusted selective feed 220, further adjusting the sequence of feed items 332 then upcoming; similarly, based on the user's actions this process can be cancelled or reversed and the user's upcoming selective feed items 332 reverted to the original sequence.

Figure 8A:
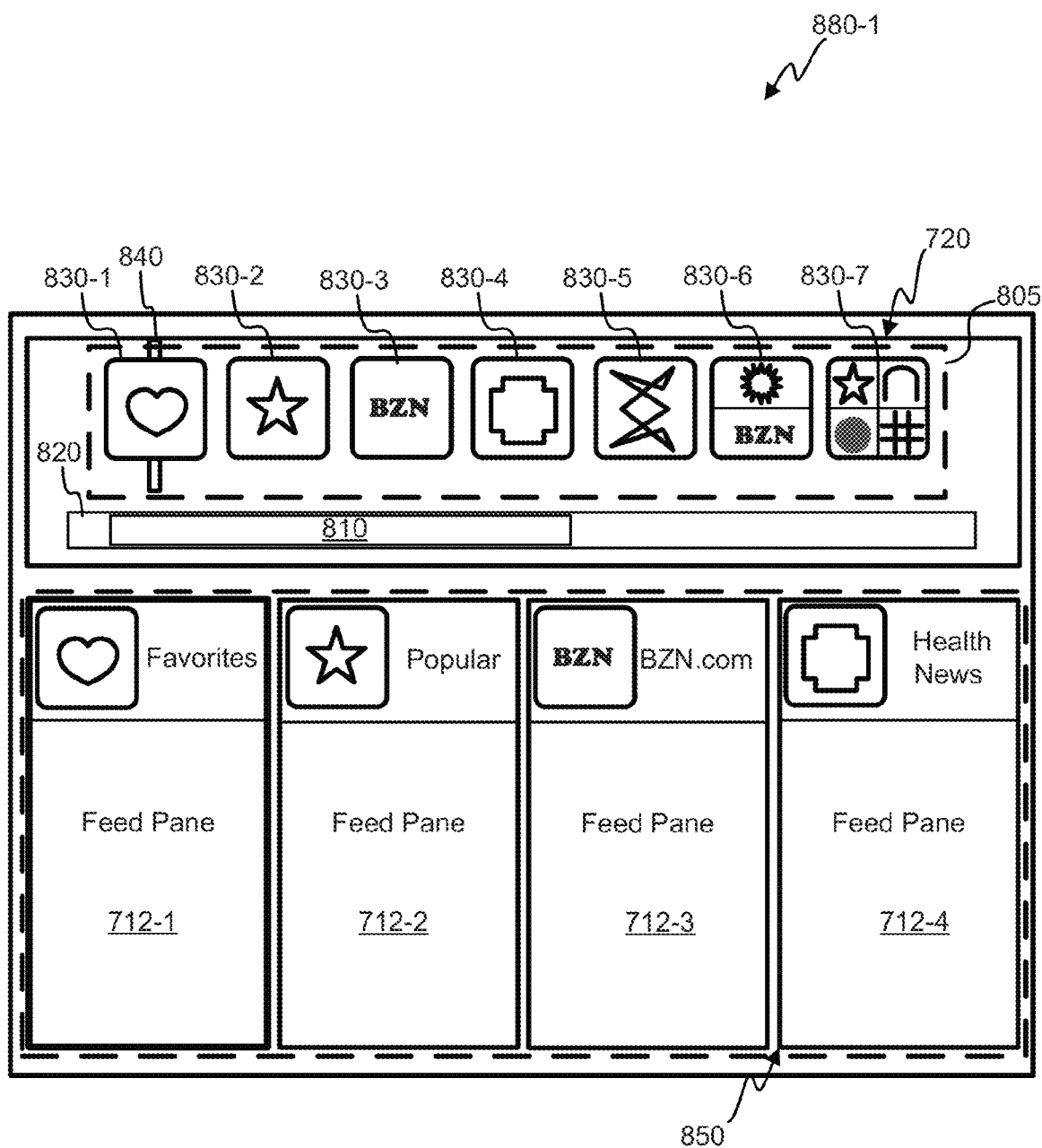
FIGS. 8A, 8B and 8C depict another embodiment of the user interface to the aggregation system.
Figure 8B:
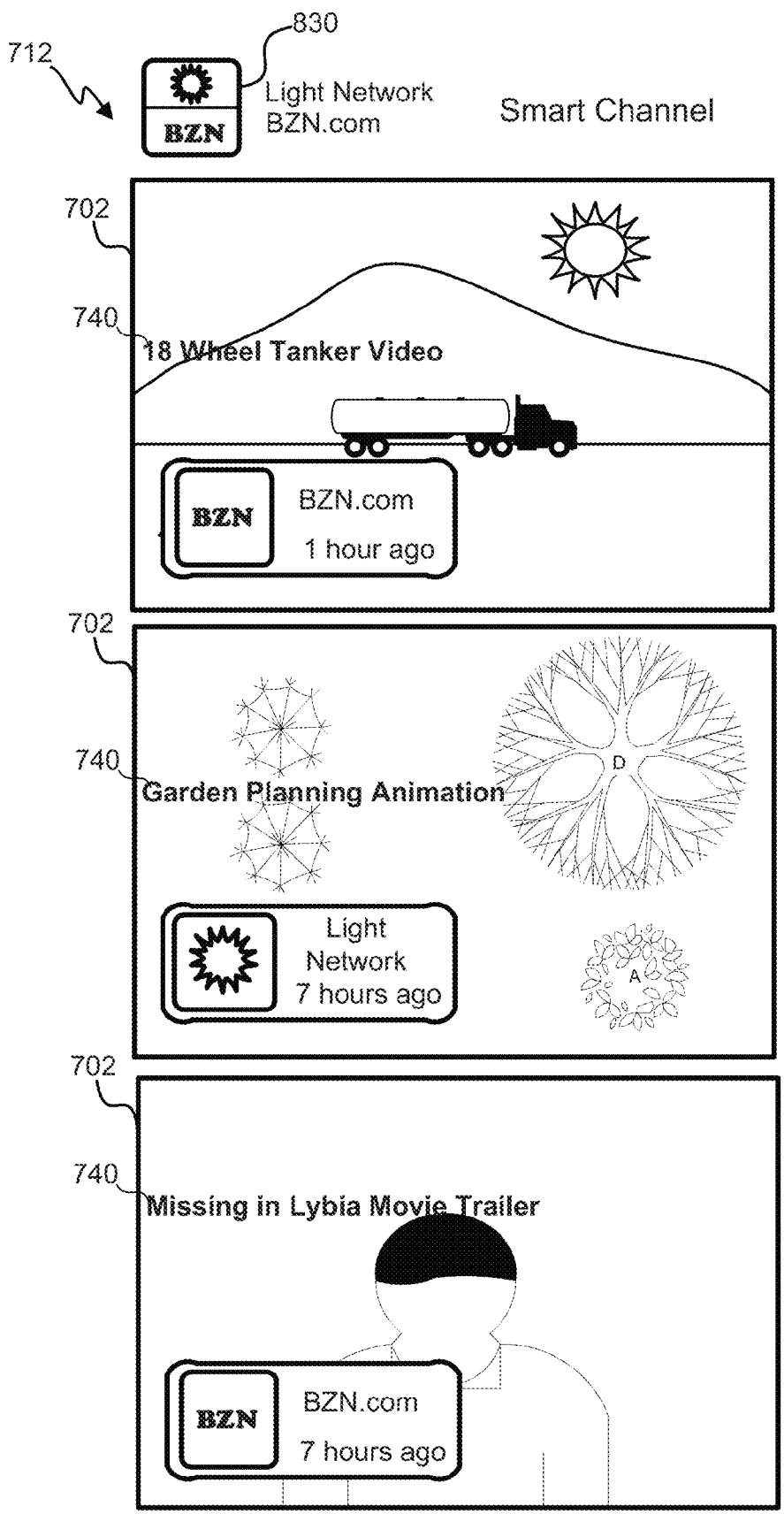
Figure 8C:
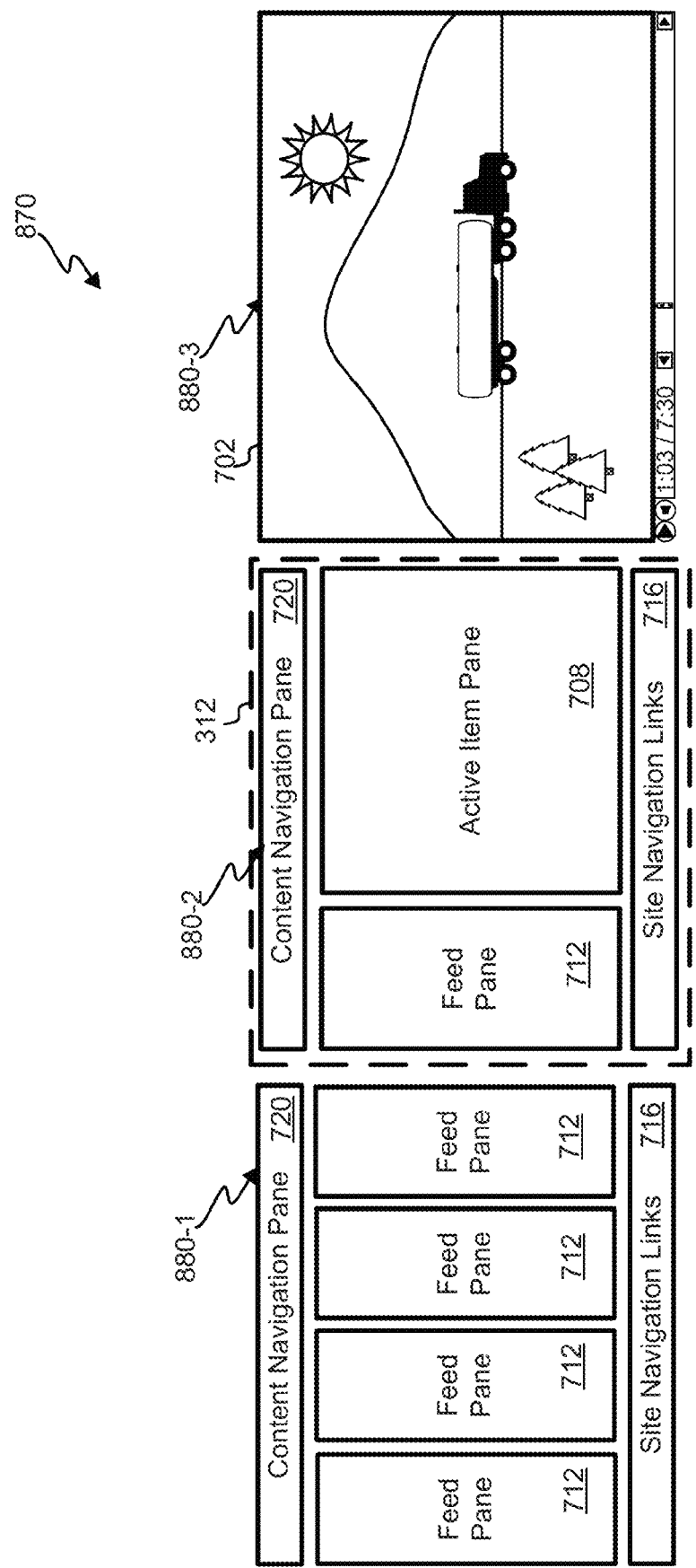

Referring next to FIGS. 8A, 8B and 8C, the user interface 312 in another embodiment comprises multiple columns, rows, or arrays of selective feed items 332, Internet feed items 308, keyword feed items, aggregate feed items 328, and/or other feed items, along with an array or multiple arrays of icons 830 in the navigation pane 720, typically displayed above the multiple columns, rows, or arrays of selective, Internet service, keyword, aggregate, and/or other feed items (hereinafter "Feed Items"), alternatively displayed to the left of the multiple columns, rows, or arrays of Feed Items, or alternatively displayed in another location. Each icon 830 identifies one or more groups of Feed Items, such as the selective feed items 332 associated with one or more user accounts on one or more social networking services, including the user's own account or another user or group of users, or the selective feed items 332 or Internet service 206 feed items associated with one or more particular Internet services 126, for example a news site such as CNN.com™ or a group of news sites selected by the user 116, or the selective feed items 332 associated with a particular keyword, subject or topic, such as a sports team or player, or the selective feed items 332 collected in an aggregate feed 204, such as recommended items. In the depicted embodiment, there are four feed panes 712 that each display a column of selective feed items 332, which is sometimes referred to as a channel or a smart channel, herein.

Behind the user interface 312 is a view carousel 870 with three different views 880 as shown in FIG. 8C related in a hierarchical manner. The first view 880-1 is not currently visible to the user through the user interface 312 that displays a window of the view carousel 870, corresponds to the highest level in the hierarchy and allows selecting from multiple selective feeds 220 or other feeds, some of which can be an aggregation of two or more selective feeds 220 or other feeds into a smart channel. The first view 880-1 is detailed in FIG. 8A. The second view 880-2 shows a particular selective feed 220 or other feed in one feed pane 712 with one video playing back in the active item pane 708. The second view 880-2 is the part of the view carousel 870 currently viewable through the user interface 312. The third view 880-3 shows a full-screen version of the video playing back. In this embodiment, touch-screen gestures move the view carousel 870, for example a two finger touch will rotate the carousel. A single finger touch will move within the current view 880 and not rotate the view carousel 870.

In this embodiment, an icon 830 in the content navigation pane 720 corresponds to one or more columns, rows or arrays of Feed Items and the icons are arranged in the same sequence as the columns, rows, or arrays of Feed Items, optionally with more or less icons 830 displayed at any time than columns, rows, or arrays of Feed Items displayed. The depicted embodiment arranges the selective feed items 332 in a column of a feed pane 712 as shown in FIG. 8B. The sequence of icons 830 rotatable about a channel carousel 805 can be moved, scrolled, advanced, retrieved, or otherwise manipulated by gesture, mouse action, cursor control, keyboard control, voice command, or other user interface control. Where all the icons 830 can fit in the content navigation pane 720, the channel carousel 805 may or may not rotate, for example in this embodiment the channel carousel 805 only rotates when there are more icons 830 than will fit in the content navigation pane 720. In a tablet computer embodiment, a single touch gesture rotates the channel carousel 805. In an optional aspect of this embodiment, an icon 830 may be linked to a sub-array of icons, such that at some times when the icon 830 appears, the linked sub-array of icons also appears, e.g. in a drop down or slider tray, and as the icon 830 is moved to the edge of the view area of the channel carousel 805 the sub-array fades away or otherwise no longer appears.

When the sequence of icons 830 on the channel carousel 805 is moved, scrolled, advanced, retrieved, or otherwise manipulated, the columns, rows, or arrays of Feed Items that are visible moves, scrolls, advances, dissolves, fades in or out, is retrieved, or is otherwise manipulated synchronously. Since the width of a feed pane 712 may be different than that of an icon 830, the channel carousel 805 may spin faster or slower than the column carousel 850 such that there may be a gearing ratio other than 1-to-1 between the two carousels 805, 850. This aspect of the user interface 312 enables a user to, for example, move the feed pane columns 712 by moving the icon sequence (for example, by dragging and dropping), and when more icons are displayed than columns are displayed, gives the user broader visibility into more, or all, columns of selective feed items 332, Feed Items that are available combined with detailed visibility into the selective feed items 332 that are available in the displayed columns of Feed Items. A scroll control 820 shows with a featured bar 810 which icons 830 have their corresponding feed panes 712 displayed. The icon 830 and feed pane 712 that would be used if the view carousel 870 is rotated is accentuated with a radio dial 840, but other embodiments could highlight the feed pane 712 or icon 830 with bolding, enhanced color, animation, or any other mechanism to inform the viewer the current focus if the view carousel 870 is rotated. The elements may move synchronously, such that moving a first element or array of elements causes a second element or array of elements to move, while moving the second element or array of elements also causes the first element or array of elements to move; or the elements may move asynchronously, such that moving a first element or array of elements causes a second element or array of elements to move, while moving the second element or array of elements does not cause the first element or array of elements to move; or a combination of synchronous movement and asynchronous movement may be implemented.

Both the icons 830 and feed panes 712 are in a synchronized order and each rotate synchronously about carousels, although the diameter of a column carousel 850 is larger than the icon carousel 805. When the user rotates one carousel, the other will rotate in a synchronized manner at a predetermined ratio of movement given the differing diameters between the two carousels 805, 850. This aspect of the user interface 312 also enables a user to rapidly move through all the columns of selective feed items 332, Feed Items that are available, for example to quickly and directly navigate to a specific desired column of selective feed items 332. The feature bar 810 informs the user which feed panes 712 are shown below and also what in the column carousel 850 is visible. In the example of FIG. 8A, the first four icons 830-1, 830-2, 830-3, 830-4 are denoted by the feature bar 810 to signal that the corresponding first through fourth selective feeds pane columns 712-1, 712-2, 712-3, 712-4. The icon appears both in the content navigation pane 720 and the corresponding feed panes 712 in this embodiment.

Optionally in this embodiment, an icon 830 can be deleted from the icon carousel 805, which optionally in turn causes the corresponding feed pane 712 to be removed from view.

Optionally in this embodiment, the icons 830 in the icon carousel 805 can be reorganized, reordered, or resequenced, by either or both the user 116 or the aggregation system 108, which optionally in turn causes the feed panes 712 in the column carousel 850 to be reorganized, reordered, or resequenced synchronously with the icon carousel 805.

Optionally in this embodiment, icons 830 in the icon carousel 805 can be combined, which optionally in turn causes the corresponding feed panes 712 to be combined; or an icon 830 can be separated into multiple constituent parts through filtering, which optionally in turn causes the corresponding columns of selective feed items 332, Feed Items to be separated; or both. Mixing and separation of icons causes corresponding rearranging of selective feed items 332, Feed Items. Where two or more icons are combined, a combined icon may be subdivided into panels that display the icons that are combined. For example, the sixth icon 830-6 combines two icons and the seventh icon 830-7 combines four icons as shown in FIG. 8A. FIG. 8B shows the feed pane 712 for sixth icon 830-6 with selective feed items 332 from both icons.

Alternatively in various embodiments, the visual interface 312 can comprise multiple columns, rows or other arrays of selective feed items 332, Feed Items, along with an array comprising any of, all of, or any combination of, buttons, tabs, badges, keys, labels, numbers, or other graphical elements in addition to, or instead of, icons, any or all of which could be organized in one or more rows, columns, alignments, or other arrays.

With reference to FIG. 9, another embodiment of the first view 880-1 is shown. In this embodiment, the selective feed items 332, Feed Items are arranged horizontally in a feed pane 712. The selective feed items 332, Feed Items can be a list with beginning and end arranged chronologically or in some other manner. In other embodiments, the selective feed items 332, Feed Items can be arranged in a circular list as a carousel, or in any other arrangement. In another optional aspect of this and other embodiments, icons 830 in the tiled icon 830-6, 830-7 may correlate to non-feed items, functions, or aspects. The icon carousel 805 is arranged vertically in this embodiment. The feed panes 712 are arranged in a vertical feed carousel 855 that rotates in synchronization with the icon carousel 805 and the scroll control 820.

In this optional aspect of the primary embodiment, this adjusted sequence can be presented continuously with, or as part of, or as the next part of, the user's selective feed 220, or can be presented as a separately labeled and separately selectable sequence of the user's selective feed 220. Adjustments to the user's upcoming sequence can be provided in real-time or near real-time, as the user 116 advances through, or as automatic playback advances through, the user's selective feed 220; can be effected between sessions; can be effected after a specified amount or type of amount of one or more types of user action has occurred; can be effected after two or more user actions have occurred in sequence, consecutively, within a specified time period, within a specified number of user actions, in a particular order or in no particular order, or otherwise have occurred; or can be effected after a specified level of confidence in the applicability of the adjustment(s) is reached.

In an optional aspect of the primary and other embodiments, an icon 830 may be logically subdivided into areas, each of which may control, activate, or indicate a subset of the Feed Items correlated to the icon 830. Areas can be reserved or prioritized for association with a particular Internet service 206, can be rearranged once associated with a set of Internet services 206, and can be labeled, unlabeled, or conditionally labeled, for example the labels appear if the user zooms the view magnification or appear if the user taps the icon with three fingers. User actions can be associated with different combinations of areas of the icon 830, for example tapping an area of the icon 830 filters the Feed Items to just those associated with the correlated Feed Items. As an example, icons 830 on a smartphone might be large and might therefore contain several areas; a particular icon 830 might be the "social" icon which is correlated to the selective feeds 220 and service feeds 206 of Internet social networking services 126 connected by the user; the upper right corner or region of the tiled icon 830-7 might be reserved for Facebook™ 126, the lower right corner for Twitter™ 126, and the other corners available for other social networking services 126; if the user taps the word "social" in the user interface 312, the selective feed 220 of selective feed items 332 from all connected social networking services 126 appears along with a corresponding tiled icon 830-6, 830-7 that would be an aggregation of the selective feeds 220, where as if the user taps a corner or region of the tiled icon 830-6, 830-7, the selective feed items 332 of the associated social networking service 126 appear. The tiled icon 830-6, 830-7 may optionally be configured programmatically by accessing a programming interface available on the device 112, provided by a device-related service, provided by the aggregation system 108 or a control system related to the aggregation system 108, or provided by another service, to connect to social networking services 126 already connected by the user 116 to the device 112, device-related service, the aggregation system 108 or a control system related to the aggregation system 108, or another service.

In an optional aspect of the primary and other embodiments, the contents and characteristics of an icon 830, a tiled icon 830-6, 830-7, and/or one or more correlated or uncorrelated Feed Items, associated with a user 116 are synchronized across one or more devices 112 or interfaces 312 used by or associated with the user 116. In this optional aspect of the primary embodiment, when the user 116, using one device 112 or interface 312, or the aggregation system 108 changes, adds, or deletes feed to or from a tiled icon 830-6, 830-7, or changes, adds, or deletes a tiled icons 830-6, 830-7, that change, addition, or deletion is reflected, subject to any further, over-riding rules or policies, on the other devices 112 or interfaces 312 used by the user 116, subject to any particular presentation (which may be different in some or all respects) of icons 830, tiled icons 830-6, 830-7 which may apply on that device 112; similarly, when the user 116, using one device 112 or interface 312, or the aggregation system 108 reorganizes a tiled icon 830-6, 830-7, for example changing the sequence, grouping, or other characteristics of the feeds in the tiled icon 830-6, 830-7, that reorganization is reflected, subject to any further, over-riding rules or policies, on the other devices 112 or interfaces 312 used by the user 116, subject to any particular presentation (which may be different in some or all respects) of icons 830 and tiled icons 830-6, 830-7 which may apply on each other device 112. Synchronization of the icons 830 and tiled icons 830-6, 830-7 may be complete or partial, may apply to all or a subset of the icons 830 and/or tiled icons 830-6, 830-7, and may apply to all or a subset of the devices 112 or interfaces 312 used by or associated with the user 116; for example, a given icon 830 or tiled icon 830-6, 830-7 may be designated as specific to a device 112 or interface 312 and therefore is not synchronized to any other device 112 or interface 312; another icon 830 or tiled icon 830-6, 830-7 may be designated as specific to device categories (e.g. smartphones; televisions) and therefore is synchronized from one device 112 or interface 312 within the category to all other devices 112 or interfaces 312 within that category but not to devices 112 or interfaces 312 that are not within that category; and still other icons 830 and/or tiled icons 830-6, 830-7 may synchronize across all devices. Synchronization of icons 830 and/or tiled icons 830-6, 830-7 can be maintained across heterogeneous view carousels 870, so that regardless of the particular view carousel in use on a given device 112 or interface 312 or in a given mode of operation, the icons 830 and/or tiled icons 830-6, 830-7 update appropriately in the context of each view carousel 870. As the icons 830 and/or tiled icons 830-6, 830-7 are updated, the Feed Items associated with the icons 830 and/or tiled icons 830-6, 830-7 will typically be similarly updated, subject to any further, over-riding rules or policies, on the other devices 112 or interfaces 312 used by the user 116, and subject to any particular presentation (which may be different in some or all respects) of feed items which may apply on that device. Additionally, irrespective of any change to the icons 830 or tiled icons 830-6, 830-7, in this optional aspect of the primary embodiment, when the user 116, using one device 112 or interface 312, or the system changes the Feed Items, for example adds or deletes or marks a Feed Item or changes the sequence or other characteristic(s) of one or more Feed Items, that change is reflected, subject to any further, over-riding rules or policies, on the other devices 112 or interfaces 312 used by the user 116, subject to any particular presentation which may apply on each other device. Such synchronized changes may be effected immediately, at a point in time, after a specified or remaining period of time, or without regard to time. Additional rules and/or policies may optionally be provided that over-ride, generally or selectively, the automatic synchronization of the icons 830 and/or tiled icons 830-6, 830-7, for example, a user 116 or the system may specify particular icons that appear in any of, all of, or any combination of: on one or more particular devices 112 or interfaces 312 but not on others, at all times or at certain times, in one viewing mode but not another, or determined by other criteria. Synchronization may apply to some, but not all, aspects, properties, attributes, or features of the contents and characteristics of icons 830, tiled icons 830-6, 830-7, and/or one or more correlated or uncorrelated Feed Items.

In an optional aspect of this embodiment, icons 830 and/or tiled icons 830-6, 830-7 may appear on a device 112 or in the interface 312 temporarily, for example because a user 116 indicated, while using an Internet service 126, an interest in adding that service feed 206 to her tiled icon 830-6, 830-7, or because an Internet service 126 linked to the tiled icon 830-6, 830-7, or as a means of suggesting or recommending a selective feed 220 to the user 116, or for another reason. A temporary icon 830 or tiled icon 830-6, 830-7 may expire based on a period of time, usage time, non-usage time, or other time-based criteria, or based on a count or sequence of actions, action opportunities, based on a count or sequence of actions, inactions, or events, or based on other criteria, or may never expire. A temporary icon 830 or tiled icon 830-6, 830-7 may appear identical to, or may appear different from, its non-temporary counterpart, for example a temporary icon 830 may optionally appear in a different color or size, or in a different place or sequence, or with a different visual intensity, or with different iconography, or with an indicator, such as a mark or graphical element, that conveys that it is temporary. A temporary icon 830 or tiled icon 830-6, 830-7 may optionally also contain actionable indicators, for example to reject or delete it, or to accept or make it permanent, or to accept for this device 112 or interface 312 or only. The Feed Items associated with a temporary icon 830 and/or tiled icon 830-6, 830-7 may be identified in the same manner as those associated with its non-temporary counterpart, or may be identified in a different manner, for example by providing a particular set, or a subset of Feed Items, may appear conditionally, for example based on a user action, gesture, or other condition, or may not appear at all, such that only the temporary icon 830 or tiled icon 830-6, 830-7 appears.

In another optional aspect of this embodiment, one or more icons 830, tiled icons 830-6, 830-7, selective feeds, Internet service feeds, keyword feeds (i.e., a feed with screened to include or exclude feed items based upon a topic, keyword, metadata tag, etc.), aggregate feeds, and/or other feeds (hereinafter "Feeds") and/or Feed Items associated with a user 116 may conditionally or non-conditionally be displayed on the user's device 112 and/or within an external interface element available on the user's device 112, such as the operating system, web browser, another application, or home screen, other screen, sub-screen, or area on a screen, or other device facility. In this optional aspect of this embodiment, instead of first installing and/or initiating the app, applet or application, which then presents the icons 830, tiled icons 830-6, 830-7, Feeds and/or Feed Items associated with the user 116, one of, a subset of, a composite of, or all of the icons 830, tiled icons 830-6, 830-7, Feeds and/or Feed Items associated with the user 116 are themselves visible on, and accessible via, the operating system, web browser, another application, or home screen, other screen, sub-screen, or area on a screen, or other device facility. Icons 830, tiled icons 830-6, 830-7, Feeds and/or Feed Items may be always be displayed, or may be displayed conditionally, such as when the user first powers on the device or selects the screen or other device facility in which the icons 830, tiled icons 830-6, 830-7, Feeds, and/or Feed Items are embedded, or upon the condition that the user 116 has configured the device 112 to display the icons 830, tiled icons 830-6, 830-7, Feeds, and/or Feed Items in this fashion, or upon the condition that there are new, unseen items in one or more of the icons 830, tiled icons 830-6, 830-7, and/or Feeds. As an example, in this optional aspect of this embodiment, two different users 116 having different tiled icons 830-6, 830-7 but otherwise having identically configured devices would each see a different home screen or other screen, whereas in another embodiment where only the app, applet or application presence is displayed on the home screen, two different users 116 having two different tiled icons 830-6, 830-7 but otherwise having identically configured devices 112 would initially see the same app presence on their respective home screens or other screens, and would only see a difference in their devices, i.e., their different tiled icons 830-6, 830-7, once they had initiated the app, applet or application. In this optional aspect of this embodiment, the embedded icons 830, tiled icons 830-6, 830-7, Feeds and/or Feed Items may also be synchronized with icons 830, tiled icons 830-6, 830-7, Feeds and/or Feed Items associated with the user 116 across any number of other devices as previously discussed, and may include, or not include, temporary icons 830 and/or tiled icons 830-6, 830-7 associated with the user 116 across other devices 112, also as previously discussed.

In this optional aspect of this embodiment, the integration of the user-dependent graphical elements and user controls associated with the icons 830 and/or tiled icons 830-6, 830-7 can be achieved using any of, all of, or any combination of: a device level programming interface; an operating system programming interface; an application level programming interface; a system level programming interface at the system controlling the device interfaces, the system controlling the icons 830 and/or tiled icons 830-6, 830-7, or both; or a system-to-system programming interface where the system controlling the device communicates programmatically with the system controlling the icons 830 and/or tiled icons 830-6, 830-7, directly or through one or more intermediate systems.

In a further optional aspect of this and other embodiments, correlated or uncorrelated Feed Items may conditionally or non-conditionally be displayed along with, independently of, and/or without the icons 830 and/or tiled icons 830-6, 830-7 being displayed.

Figure 10A:
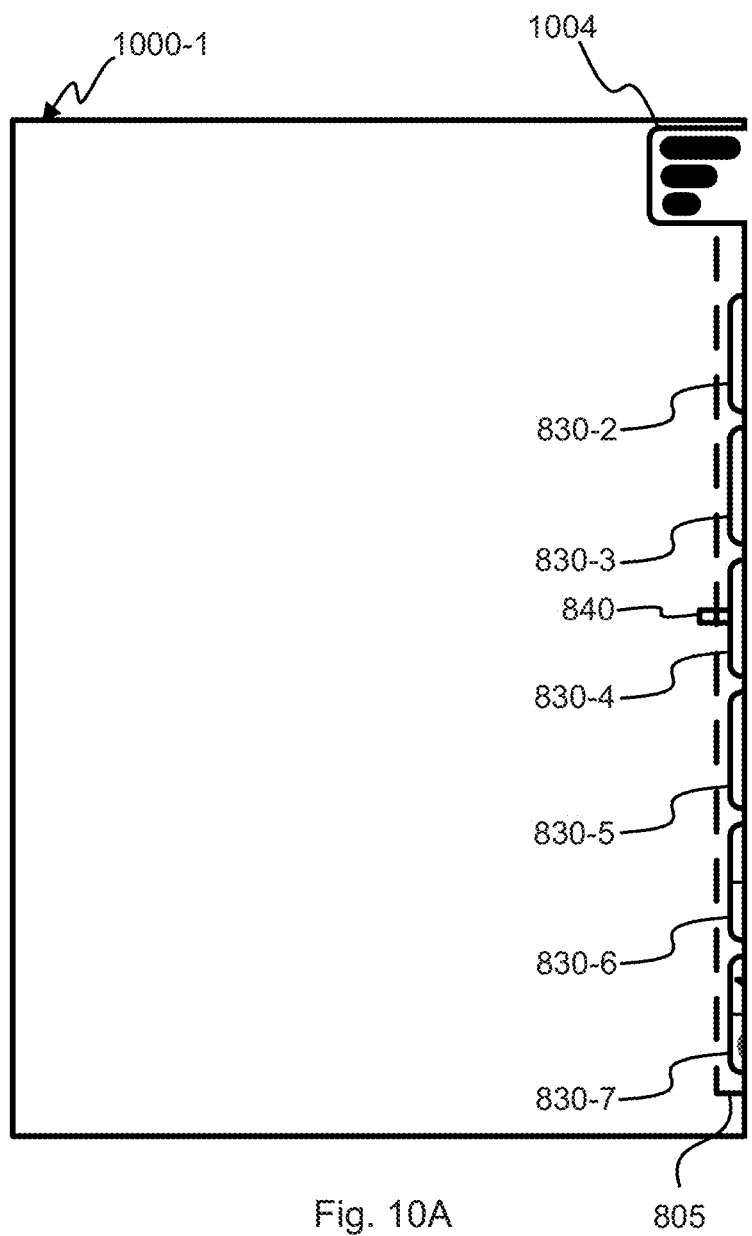
FIGS. 10A, 10B and 10C depict another embodiment of the user interface to the aggregation system.
Figure 10B:
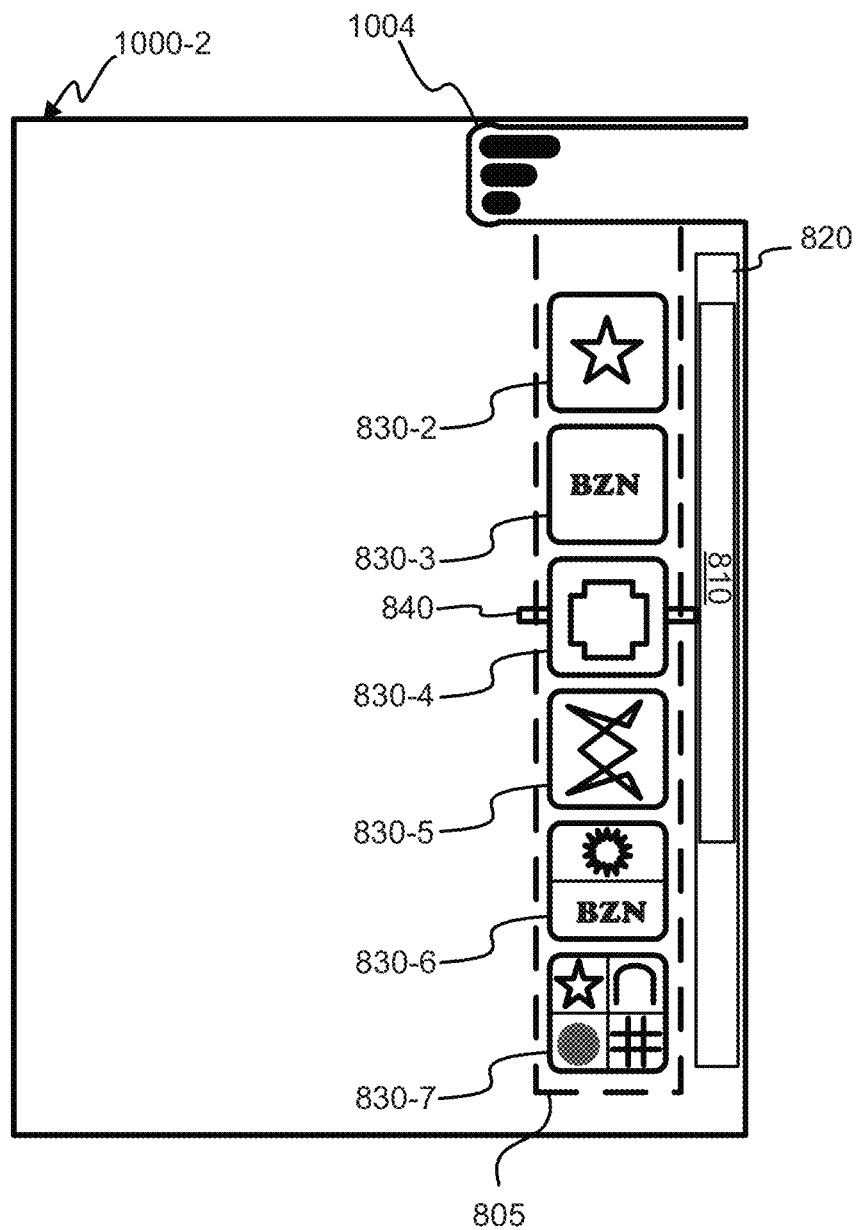
Figure 10C:
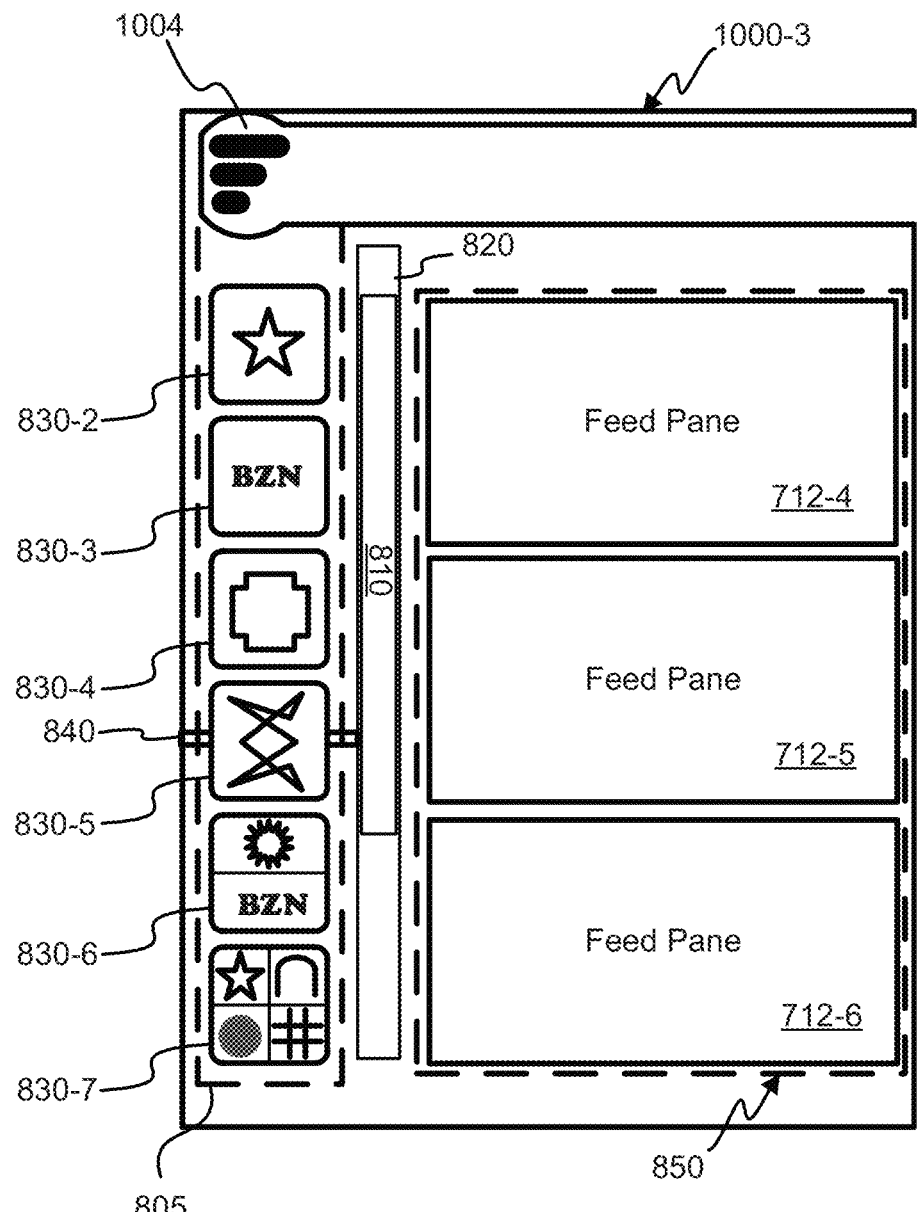

In an optional aspect of this and other embodiments, touching, dragging, clicking, activating, or otherwise engaging with one or more of, or the group of, or a particular one of or subset of, the displayed icons 830, tiled icons 830-6, 830-7, and/or Feed Items, further causes the user's device and/or an interface element available on the user's device, such as the operating system, web browser, another application, or other device facility, to display one or more additional icons 830, tiled icons 830-6, 830-7, Feed Items, or feed item content, with or without activating the user interface 312 in its entirety. In this manner, the displayed icons 830, tiled icons 830-6, 830-7, and/or Feed Items can be used to invoke the user interface 312 or to further view content and selections without invoking the full interface. This limited interface could be a user configurable interface widget that could be placed on any of the four edges of the screen. As one example of the interface 1000 shown in FIGS. 10A-10C, displayed icons 830 or tiled icons 830-6, 830-7 could appear as a single row of icons running along one edge of a smartphone or tablet home screen 1000-1, such that each user of the interface 1000-1 would have a personalized array of icons immediately available by pulling a tab 904 without first invoking the full interface as shown with the tab not pulled in FIG. 10A; dragging the tab 904 from right-to-left, the displayed icons 830 and tiled icons 830-6, 830-7 are shown in a rotating or scrolling column for the interface 1000-2(for a carousel 805 that contains more icons than can be displayed in the area along one edge of the smartphone home screen) as shown in FIG. 10B; further dragging the icons 830 or tab 904 in a direction perpendicular to the length of the column in the interface 1000-3 could reveal the feed item carrousel 850 showing feed items associated with icons 830 as shown in FIG. 10C; touching a Feed Item in one of the feed panes 712 could invoke playback of the video; all accomplished from the smartphone home screen without first invoking the full interface.

Figure 11:
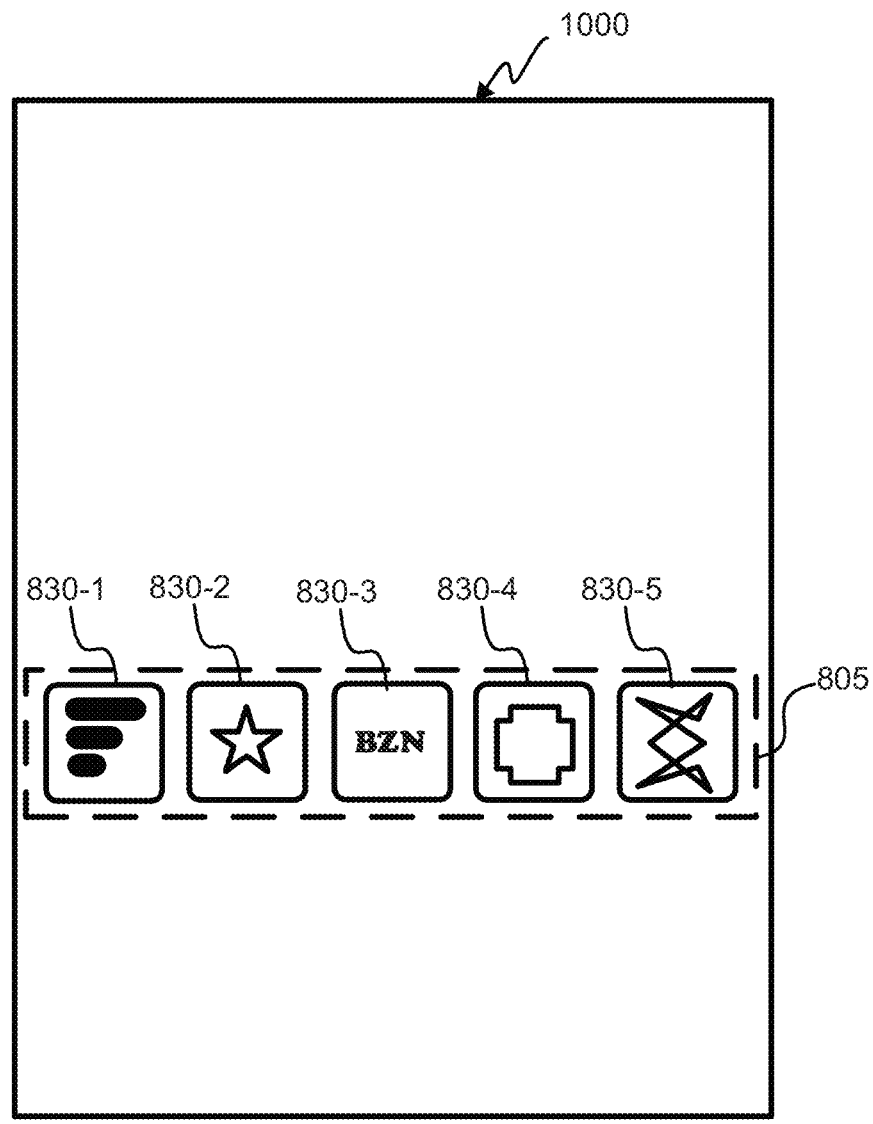
FIG. 11 depicts yet another embodiment of the user interface to the aggregation system.

Referring next to FIG. 11, another embodiment of the smartphone or tablet interface 1000 is shown with the channel carousel 805 arranged horizontally to rotate right-to-left or vice versa. This limited interface could be configured by the user as an interface widget to occupy any horizontal region of the screen giving the option to be higher or lower on the screen. Selecting any icon 830 would display the corresponding feed panes 712 for some or all of the visible icons (not shown) as a horizontal carousel either above or below the channel carousel 805. Selection of a Feed Item in a feed pane 712 would activate a video window 702 (not shown) either above or below the channel carousel 805. In some embodiments, the activation of the video window 702 would fill the entire screen or at least obscure the channel carousel 805 in whole or in part.

In an optional aspect of the primary and other embodiments, the user 116 can optionally select among multiple genre modes. Each genre mode comprises a combination of icons 830 and/or tiled icons 830-6, 830-7 and optionally further comprises a combination of correlated or uncorrelated Feed Items. When a genre mode is selected by the user 116, only those icons 830 and/or tiled icons 830-6, 830-7, and optionally correlated or uncorrelated Feed Items that are associated with the selected genre are displayed by that interface 312 while in the mode. Icons 830 and/or tiled icons 830-6, 830-7, and optionally correlated or uncorrelated Feed Items can be associated with only one, more than one, or a specified number of genres, and/or can have a degree of genre association which can be used to determine which of a user's particular set of icons 830 and/or tiled icons 830-6, 830-7, and optionally correlated or uncorrelated Feed Items should be associated with that genre for genre mode purposes or other purposes. Optionally, a genre may contain, or may contain only, icons 830 and/or tiled icons 830-6, 830-7, Service feeds, Service feed items, and optionally correlated or uncorrelated Feed Items that are not contained in the user's selections, e.g. a genre comprising only recommendations for inclusion in the user's selections, or a genre containing some current selections and some recommendations for inclusion in the user's selections, in either case optionally further limited to a subset of all possibilities; in this mode, the user can optionally choose if only their previously-selected Feed Items are used for the genre filter or if their Feed Items can be supplemented or replaced by feed items that were not previously selected. Optionally, the user 116 can control which genres are available to her. Genres may comprise any attribute or basis for sorting, filtering, or selecting among icons 830 and/or tiled icons 830-6, 830-7, Service feeds, Service feed items, and optionally correlated or uncorrelated Feed Items, including, but not limited to, category, topic, time, viewing history, length, sources, keywords, content elements, ratings, popularity, actor, creator, creation time or date, and/or other attributes. Genres could also comprise users or groups of users of a device 122. As an example of genre mode, a user 116 might have configured her system to offer her a choice of music, movies, fashion, politics, and sports as genres available to her; in this example, when she selects the music genre, icons associated with the music genre or that contain feed items associated with the music genre would be displayed; as a result, her icons for particular musicians, music blogs, and music services would be displayed, each with all associated feed items, plus icons for her social networking services would be displayed, each with all associated feed items that are also associated with the music genre, e.g. her Twitter™ icon would be displayed along with items from her Twitter™ feed that are related to music. Continuing the example, when she selects the politics genre, a different set of icons would be displayed, these icons associated with the politics genre or containing feed items associated with the politics genre; as a result, her icons for particular politicians or political commentators, political parties, and politics blogs would be displayed, each with all associated feed items, plus news services with feed items related to politics would be displayed, each with all associated feed items that are also associated with the politics genre, e.g. her CNN™ icon would be displayed along with items from her CNN™ feed that are related to politics, plus icons for her social networking services would be displayed, each with all associated feed items that are also associated with the politics genre, e.g. her Twitter™ icon 830 would be displayed along with items from her Twitter™ feed that are related to politics. Further genre modes can be contained within a given genre mode, so for example the sports genre mode might further contain a basketball genre mode, which might further contain a college basketball genre mode, or the sports genre mode might contain both the basketball genre mode and the college basketball genre mode. As another example, genre choices available to a user could be standard, users, and recommended. In this example, when she selects standard mode she sees her normal set of icons 830 and Feed Items; when she selects users mode she sees a set of icons 830 that all correlate to other users contained within her standard array of icons 830 and service feeds 206, including optionally individual users that do not appear separately in her standard mode; and when she selects recommended mode she sees icons 830 and Feed Items that do not appear in her standard mode view but that are recommended for her for inclusion, at her option, in her personal configuration.

The visual representation of the genre modes available, the selected genre mode, and other genre mode related characteristics may optionally be implemented as an icon, array of icons, or sub-array of icons, as a separate indicator, message, pull-down control, keyword control, or symbol, conditionally indicated to the user 116, or not indicated to the user 116. When more than one genre mode is available to the user 116, the selected genre mode may be continuously, periodically, conditionally, or partially synchronized, or not synchronized, from one device used by the user 116 to another device 112 used by the user 116.

In an optional aspect of the primary and other embodiments, a user can optionally, conditionally, or non-conditionally share, or prohibit sharing of, in real-time, near real-time, retrospectively, or in aggregate, some or all of her icons 830 and/or tiled icons 830-6, 830-7, other user interface elements, components, contents, messages, or characteristics, or selection of genre or other mode, and/or correlated or uncorrelated Feed Items, Feeds, as well as associated actions, user actions, and responses to user actions, with one or more other users of the aggregation system 108, with one or more other users of another Internet service 206, such as a social networking service 126, or with one or more users of another service enabled by the user's device or by interconnection of the user's device with another system or service. Such sharing can be implemented automatically, periodically, continuously, as a result of an action or selection by the user or another user, or on another basis. For example, a user 116 could optionally share her tiled icons 830-6, 830-7 along with any Feed Item filtering with another user 116 of the aggregation system 108, so that the receiving user could see and, at her option adopt, some or all of the icons 830, tiled icons 830-6, 830-7, icon combinations, or icon configurations, along with the correlated Feeds, of the sharing user. Such sharing could be implemented by allowing the sharing user to send some or all of her icon configuration to the receiving user, or by enabling the sharing user to publisher her icon configuration or a portion of it so that any other user can see and optionally adopt some or all of it, or by enabling the receiving user to request, and the sharing user to allow or not allow, access to the sharing user's icon configuration, or by any similar process. As another example, a user 116 could optionally share, in real-time or near real-time, with other users of the aggregation system 108 or with other users of a social networking service, each icon selection action that she takes, such that other users would be notified of the icons 830, tiled icons 830-6, 830-7, and/or Feeds selected by the sharing user, and optionally of the device 112 the sharing user is using to access the aggregation system 108, from moment to moment as the sharing user uses the aggregation system 108.

In addition, a user can optionally, conditionally, or non-conditionally allow or not allow, in real-time, near real-time, retrospectively, or in aggregate, sharing to her of some or all of the icons 830, tiled icons 830-6, 830-7, Feeds, other user interface elements, components, contents, messages, or characteristics, or selection of genre or other mode, and/or correlated or uncorrelated Feed Items, as well as associated actions, user actions, and responses to user actions, from one or more other users of the aggregation system 108, from one or more other users 116 of another Internet service 206, such as a social networking service, or from one or more users 116 of another service enabled by the user's device or by interconnection of the user's device 112 with another system or service.

In the primary and other embodiments, implementation, configuration, synchronization, coordination, management, and sharing of icons 830, and/or groupings of icons 830 and/or tiled icons 830-6, 830-7, and/or other user interface elements, components, contents, messages, or characteristics, or genre or other mode, and/or correlated or uncorrelated Feed Items, as well as associated actions, user actions, and responses to user actions, can be implemented through any of, all of, or any combination of, a direct data or programming interface between the user interface 312, the user's device 112, and/or an interface element available on the user's device, such as the operating system, web browser, another application, or other device facility, and the feed presentation interface operating on the device; a data or programming interface between the visual user interface 312, the user's device 112 and/or an interface element available on the user's device 112, such as the operating system, web browser, another application, or other device facility, and the aggregation system 108 or other control system associated with the aggregation system 108; a data or programming interface between an intermediate system communicating directly or indirectly with the visual user interface 312, the user's device 112 and/or an interface element available on the user's device 112, such as the operating system, web browser, another application, or other device facility, and the feed presentation interface operating on the device; a data or programming interface between an intermediate system communicating directly or indirectly with the user interface 312, the user's device 112 and/or an interface element available on the user's device, such as the operating system, web browser, another application, or other device facility, and the aggregation system 108 or other control system associated with the aggregation system 108; a data or programming interface communicating directly or indirectly between the aggregation system 108 and an Internet service 206 or another system or service; a data or programming interface communicating directly or indirectly between the aggregation system 108 and an Internet service 126 or another system or service, utilizing user access credentials to access the aggregation system 108, the Internet service 126, and/or another system or service; or another data or programming interface that communicates the contents of, or information about, the icons 830, tiled icons 830-6, 830-7, and/or other user interface elements, components, contents, messages, or characteristics, or genre or other mode, and/or Feed Items, or other information associated with one or more users 116 of the device 112 or user interface 312.

In an optional aspect of the primary embodiment, the user 116 has the option of selecting regular viewing mode, which plays each video in the selective feed 220 in full as presented (that is, plays the first video, then plays the next video, then plays the next video) or can select a quick-play viewing mode activated by a quick-play control 754, which plays one or more excerpts of each video, rather than the full videos, in scan sequence. In this optional aspect of the primary embodiment, the excerpts may be of a specific length, may be of selectable length by the user 116, may be of a length selected by the aggregation system 108, or may be of a length separately selected for each feed item 332 by the aggregation system 108 for each. In this optional aspect of the primary embodiment, the user 116 has the option of clicking on a play-in-full icon, which then initiates playback of the full feed item 332 from the beginning; upon completion, the aggregation system 108 will stay in regular viewing mode of the active viewing pane 708 for the next feed item 332 in the user's selective feed 220, or in another optional aspect of the primary embodiment, the aggregation system 108 will return to quick-play viewing mode for the next feed item 332. When the user 116 selects quick-play viewing mode or alters the settings (length of excerpt, etc.) of quick-play viewing mode, the presentation of the user's selective feed 220 is filtered to include only those feed items 332 for which the necessary excerpt(s) is(are) available, thus presenting the user 116 a selective feed 220 that functions properly in this mode.

In another optional aspect of the primary embodiment, content publishers and/or Internet services 126 may be offered the option of prohibiting quick-play viewing mode or of specifying one or more excerpts to be presented in quick-play viewing mode. If a content publisher 126 has elected to prohibit quick-play viewing mode, when the user 116 selects this viewing mode the presentation of the user's Feed is additionally filtered to include only those Feed Items for which the content publisher 126 has not prohibited quick-play viewing mode, thus presenting the user 116 a Feed that functions properly in this mode. If a content publisher 126 has elected to specify one or more excerpts to be presented in quick-play viewing mode, when the user 116 selects this mode the presentation of the user's Feed is additionally filtered to include only those Feed Items for which the specified excerpt matches the quick-play viewing mode settings, or alternatively, the user's settings are overridden and the content publisher's 126 selected excerpt is presented even though it does not meet the user's quick-play viewing mode settings.

In another optional aspect of the primary embodiment, content publishers 126 may be offered the option of prohibiting quick-play viewing mode on specific devices 112 or specifying the excerpt to be used on a particular device 112 in quick play viewing mode. If a content publisher 126 has elected to prohibit quick-play viewing mode on specific devices 112, when the user 116 selects quick-play viewing, the presentation of the user's Feed is additionally filtered to include only those Feed Items for which the content publisher 126 has not prohibited quick-play viewing mode on the device 112 the user 116 is using for playback, thus presenting the user 116 a Feed that functions properly in this mode. If a content publisher 126 has elected to specify one or more excerpts to be presented in quick-play viewing mode on a particular device 112, when the user 116 selects this mode the presentation of the user's Feed is additionally filtered to include only those Feed Items for which the content provider's 126 specified excerpt for the device 112 being used by the user 116 matches the quick-play viewing mode settings, or alternatively, the user's settings are overridden and the content publisher's 126 selected excerpt for the device 112 being used by the user 116 is presented even though it does not meet the user's quick-play viewing mode settings.

In the primary embodiment, the Feed presented to the user 116 may optionally be modified (expanded or narrowed) based on the capabilities of the device 112 in use by the user 116 to effectively render the video content that comprises, is contained in, is referred to by, or is otherwise indicated by, the Feed Items in the Feed. In the primary embodiment, the ability to effectively render the video content is determined in absolute terms, that is, either the device 112 can render it or the device 112 cannot; in another embodiment, the ability to effectively render the video content is determined in qualitative terms, such as based on how well the device 112 can render the video content, based on the relative quality of the video playback in the context of the device's overall capabilities, or based on the relative quality of the video playback in the context of the particular user's or a typical user's normal usage of the device 112. In some embodiments, the Internet service 126 can specify a minimum quality of service such that their video is rendered at an adequate quality and if the user device 112 is not capable of the specified minimum quality, those Feed Items are removed, hidden or disabled from the Feed.

In an optional aspect of the primary and other embodiments, the device 112 can notify the aggregation system 108 when it receives a Feed Item that does not reference renderable video, or that references video that renders poorly, or that references video that is blocked or prohibited from playing or that otherwise does not play properly or with adequate quality of service (QoS). The aggregation system 108 can evaluate the notifications received from multiple devices 112, including the number of notifications that have been received (including optionally receiving just one notification); the frequency with which the notifications are received; the changes in velocity of the notifications; the geographic, network, domain, subdomain, or other locations from which the notifications are received; the format, encoding, bitrate, or content attribute; the device or devices 112, class of device 112, software or firmware version of the device 112 from which the notifications are received; or other factors associated with the notifications received; and remove the Feed Item from the Feed of some or all users 116, and optionally remove other related, similar, or otherwise correlated Feed Items from the Feed of some or all users 116. For example, a Feed Item may stop rendering properly on a set top box device 112, but render appropriately on tablet computers 112. For Feeds played on set top box devices 112, the Feed Item would be removed or disabled, but would remain in a Feed sent to a tablet computer 112. Where the players 112 report problems that correlate to one of the above factors, similarly situated users 116 could have that Feed Item disabled. Additionally, support personnel associated with the aggregation system 108 could be notified so that the rendering failure could be corrected, for example by contacting the provider of the service feed in which the Feed Item originated, by updating or otherwise modifying the user interface 312, by modifying the rendering system 112 so that the affected Feed Item(s) can be properly viewed, or by other corrective action. For example, a service feed provider may change its video player software or video encoding techniques such that the Feed Items are no longer playable on the rendering system 112. Support personnel could correct the interface software that retrieves video from the service feed provider's Internet domain or from the service feedprovider's feed to enable the video from the service feed provider to play correctly in the rendering system 112. Feed Items 332 that were disabled could be re-enabled after this correction is made and the previously unrenderable Feed Items were reprocessed and made available to the relevant Feeds.

In an optional aspect of the primary embodiment, the Feed presented to the user 116 may optionally be modified (expanded or narrowed) based on the user's Feed Items that are accessible or accessed and the device 112 in use by the user 116, based on policies, attributes, or characteristics associated with the Feed Items, including the preferences or settings specified by any of, all of, or any combination of the producer of, publisher of, distributor of, contributor to, or other party affiliated with one or more items or the content contained in, or referenced by, one or more Feed Items, or by one or more Internet services 126 that contributed one or more feed items, or the content contained in, or referenced by, one or more Feed Items, to the feed. In an optional aspect of the primary embodiment, the feed presented to the user 116 may optionally be modified (expanded or narrowed) based on the user's Feed Items and the device 112 in use by the user 116, based on policies, attributes, or characteristics associated with the device 112, including the preferences or settings specified by the manufacturer of, distributor of, or other party affiliated with the device 112. In another optional aspect of the primary embodiment, the Feed presented to the user 116 may optionally be modified (expanded or narrowed) based on the user's Feed Items and the network or network segment to which the device 112 in use by the user 116 is attached, based on policies, attributes, or characteristics associated with the network or network segment, including the preferences or settings specified by the network or network segment operator, including a network operator, an enterprise or other organization, or an operator of a home or other premises network.

In the primary embodiment, the user 116 can view a subset of the Feed and/or playback of the video content that comprises, is contained in, is referred to by, or is otherwise indicated by, the Feed Items in the Feed based on (including or excluding) all of, any of, or any combination of: the Internet service(s) 126 from which one or more Feed Items were obtained; the user(s) 116 or other entity(ies) associated with the Internet service(s) 126 from which one or more Feed Items were obtained; the source(s) where one or more Feed Items were referenced; the source(s) where one or more Feed Items were published; the source(s) where one or more Feed Items were first published; one or more lists or categories of Internet services 126; one or more lists or categories of users of one or more Internet services 126; one or more lists or categories of sources where Feed Items are referenced, published, or first published; one or more topics to which one or more Feed Items refer; one or more categories of topics or within which one or more topics are included; one or more time ranges, timeframes, sequences, or dates; one or more ratings, either globally or within one or more Internet services 126; activity related to one or more Feed Items; or other criteria associated with one or more Feed Items.

In an optional aspect of the primary embodiment, the user 116 can attach one or more devices 112, such as connected consumer electronics equipment, video game consoles, smartphones, set top boxes, pad/tablet computers, and other devices, to his or her user account with the aggregation system 108. In the primary embodiment, the user 116 navigates to a code available on the device 112 she desires to connect to her account, then enters that code into her account through the user interface 312. In an alternative method for connecting a device 112 to her account, the user 116 navigates to a sign-in screen on the device 112 she wishes to connect and enters her username and password, thereby signing into the aggregation system 108 from the desired device 112. In another method for connecting a device 112 to a user's account, the device 112 is configured before shipment to connect to her account, based on information she provides or that is otherwise available, for example at the time of placing the order. Under any of these or other methods, the aggregation system 108 of the primary embodiment then identifies the device type, unique identification information, and other technical and configuration characteristics, identifies the device 112 as connected to the user's account, and provides the appropriately configured Feeds, properly formatted service feed Items, other user interface parameters and elements, operational parameters, controls and commands, and other content and data to the device 112, and accepts data, input, and other appropriately formatted (and, if desired, authenticated) entries from the device 112. In one embodiment, a device 112 can only be attached to a single user account with the aggregation system 108; in another embodiment, a device 112 can be attached to multiple user accounts of the aggregation system 108.

In an optional aspect of the primary embodiment, the aggregation system 108 determines one or more home regions, locations, or other geographic characteristics of a user 116, or of a device 112, or the combination of a user 116 and device 112, with any appropriate level or range of geographic or cultural precision, such as a global region (e.g., North America, Western Europe), continent, country, state, county, city, postal code, designated marketing area (DMA), census tract, language, zone, or other cultural environs. The home regions, locations, or other geographic characteristics can then be used to filter, prioritize, select, or make substitutions for, some or all feed items, or versions of feed items, or versions of content associated with feed items, such as video content, presented in or with the Feed for a user 116, for example to select a version of a Feed Item that is presented in a language specific to, or appropriate for, a region, location, or characteristic, or that contains a content version tailored to, or appropriate for, a region, country, or location, or substitute one such version of a Feed Item for another, or as another example to filter out a Feed Item 332 that is not appropriate for, or is prohibited for legal or regulatory reasons in, a country or location. In another embodiment of this optional aspect of the primary embodiment, the user 116 can specify her home region, location, or other geographic characteristics. In yet another embodiment, the aggregation system 108 determines one or more home regions, locations, or characteristics of a user 116, the user 116 can also specify her home region, location, or other geographic characteristics, and the aggregation system 108 can determine when, under what conditions, and/or for which Feed Items to use the home region, location, or other geographic characteristics specified by the user 116 and when, under what conditions, and/or for which Feed Items to use the home regions, locations, or other geographic characteristics determined by the aggregation system 108. In one embodiment, the Internet service 126 can specify a home region, location, or other geographic characteristics on a per service feed 206 or per Service feed item 308, which is communicated to the aggregation system 108 and can be used by the aggregation system 108 independently, or in conjunction with, the home region, location, or other geographic characteristics determined by the aggregation system 108, or the home region, location, or other geographic characteristics specified by the user 116, or both.

In an optional aspect of the primary embodiment, the user interface 312 of the aggregation system 108 presents the user 116 with a list of, or array, comprising one or more of the devices 112 connected to the aggregation system 108, optionally including the manufacturer, model, device type, carrier, unique identifier, and/or other relevant descriptive data; allows the user 116 to provide customized names or identifiers to each device 112 (such as "John's smartphone" or "Living Room TV"); enables the user 116 to manage each device 112, including to cancel the connection of that device 112 to the user's account; enables the user 116 to manage which of his or her Feeds, subsets of feeds, lists of items, or other category or subset of Feed Items is available on each device 112, and under what label or title; enables the user to identify or save Feed Items for a specific device or devices 112, for example, while browsing the web via a web browser or while reviewing her Feed from a connected smartphone, identify or save a video for viewing on the device "Living Room TV" or on the group of devices "TVs at Home"; enables the user 116 to manage the lengths of items, content of items, category of items, or other item attributes that will determine or influence which content or Feed Items are available on that device 112; allows the user 116 to control one connected device 112 from another, such as controlling a connected Blu-Ray player from a connected smartphone; control how one or more Feeds, subset(s) of the Feed(s), or group of content or Feed Items is/are filtered and/or presented on the device or another device 112; and enables the user 116 to save, rollback changes to, or recover prior versions of, such configurations, information, settings, or controls associated with one or more devices 112.

In an optional aspect of the primary and other embodiments, the aggregation system 108 accesses multiple Internet services 206 by accessing a single shared content management system. The aggregation system 108 may use a single system-level access technique, such as a token, sign-in sequence, shared secret key, public key, digital signature, or other authorization technique, to access the shared content management system, or may use an individual system-level access technique to access the shared content management system for each authorized Internet service 206 associated with the shared content management system, or may access the shared content management system without any system-level access control. The aggregation system 108 can use common access, interface and processing steps and techniques for all Internet services 206 associated with a particular shared content management system, while still identifying the separate Internet services 206 associated with the shared content management system and identifying, and maintaining the association of, Feed Items and other associated information (such as metadata) with the proper Internet service 206 associated with the shared content management system. The aggregation system 108 may similarly access multiple shared content management systems concurrently or sequentially. If a given Internet service 206 is associated with more than one shared content management system, the aggregation system 108 can optionally maintain separation of the Feed Items and other associated information from some or all of the shared content management systems associated with the Internet service 126, or can merge some or all of them into a single Feed of content and/or associated information associated with the Internet service 126. If a given Internet service 126 migrates from one shared content management system to another shared content management system, the aggregations system 108 can access the new shared content management system using any new required system-level access techniques required and can optionally merge some or all of the Feed Items and other associated information into a single Feed of content and/or associated information associated with the Internet service 126.

In an optional aspect of the primary and other embodiments, the operator of the aggregation system 108 or another service provider can provide any of, some of, all of, or any combination of technical optimization, digital advertising execution, user activity reporting, and synchronization with other applications for providers of content Feeds, Internet services, or other content, data, or services to the aggregation system 108.

Technical optimization includes, but is not limited to, audio and/or video encoding and/or transcoding, at one encoded bitrate or at multiple encoded bitrates; audio and/or video encoding and/or transcoding to adapt files for delivery to particular devices, including detecting the device 112 and selecting an appropriate technical format associated with the device 112; segmenting encoded files into appropriate segment sizes for delivery adapted to various devices 112 and/or various network connectivity conditions, so that files are encoded in the proper format and protocol for particular devices, and/or so that overall segment lengths are appropriate for a given device, given the heterogeneous memory, processor, buffer, and other technical characteristics of different devices 112, and/or so that higher bitrate segments can be requested and/or delivered when more network throughput is available, while lower bitrate segments can be requested and/or delivered when less network throughput is available;

and file transmission, or delegation of file transmission to one or more selected data services providers or data, storage, or computing infrastructure providers.

Digital advertising execution includes, but is not limited to, issuing one or more appropriately formatted advertising requests to one or more advertising services or servers before, after, during, or in conjunction with a content request, play, other user action, or independently of a user action; identifying the appropriate advertising service or server to issue advertising requests to, including allocating advertising requests among multiple advertising services or servers for a given content request or play or among a series of content requests or plays; and including based on the service feed source, content publisher, content distributor, or other entity associated with the content, device, network, or user; generating, retrieving, sending and/or receiving parameters associated with digital advertising from data files or tables, or in URIs, content tags, embed codes, scripting languages, or programming calls; incorporating digital or other advertisements into the content experience, including displaying or inserting audio, video, graphic, or other advertisement content before, after, during, in overlay, in alphablend, in conjunction with, or independently of, audio, video, graphic, or other content; and reporting completed advertisement views to one or more advertising services or servers, measurement services or servers, and/or other services or servers.

User activity reporting includes, but is not limited to, issuing appropriately formatted URL requests, pixel requests, data messages, commands, or other data interactions to one or more measurement servers or services, analytics servers or services, reporting servers or services, or other servers or services. The activity reporting could be used by the aggregation system 108 and optionally provided back to the Internet services 126 for their Feeds and/or Feed Items.

Synchronization with other applications includes, but is not limited to, linking between the user interface 312 or user device 112 and one or more other applications; linking specifically from a given Feed or Feed Item to one or more other applications; including in the linking process an identification of the user's identity, in the context of the aggregation system, the provider of the other application(s), or the provider of another Internet service 126; including in the linking process an identification of what content or other item, or location within the user interface 312 or user device 112, or user action the user selected, viewed, interacted with, or performed that resulted in, or was associated with, linking to the one or more other applications; prompting, from the user interface 312 or user device 112, the download of one or more other applications; and notification, in the user interface 312 or user device 112, of the availability of one or more other applications or services.

Technical optimization, digital advertising execution, user activity reporting, and synchronization with other applications can be technically implemented through any of, all of, or any combination of: execution as part of the user interface 312; as part of software functionality on the device 112; as part of the aggregation system 108; as part of a system associated with the aggregation system 108; as part of an Internet service 126 associated with the aggregation system 108 and/or the user 116; as part of, or in conjunction with, a content management system, shared content management system, or other system associated with a service feed 206; as a standalone system or programming interface; as a standalone Internet service 126; through a programming interface or other digital interface of the device 112, the operating system executing on the device 112, or other software executing on the device 112; through a programming interface or other digital interface available in conjunction with the network connected, directly, indirectly, or through an intermediate network, to the user device 112.

In one implementation of this aspect of the primary and other embodiments, technical optimization, digital advertising execution, and user activity reporting are provided by the operator of the aggregation system 108. In this implementation, a service feed provider enables access to an XML feed of video content items as video service feed items are published or otherwise become available; enables access to its digital advertising server; enables access to an XML feed of its digital advertisements; provides a configuration for its content delivery service; and provides one or more reporting service URLs or beacons. The operator of the aggregation system 108 receives the XML feed of video content items from the service feed provider; encodes and/or transcodes the video feed items into one or more suitable encoded file formats, each at one or more bitrates, preparing the video content for playback on some or all of the devices supported by the aggregation system 108; where supported by the device 112 and/or expected delivery conditions, segments the encoded files into one or more segment lengths suitable for some or all of the devices 112 supported by the aggregation system 108; and associates one or more Internet URLs or other content identifiers with each encoded file or segment. The operator of the aggregation system 108 also receives the XML feed of advertisements and similarly prepares the advertisements for playback on some or all of the devices 112 associated with the aggregations system 108. The operator of the aggregation system 108 then provides in the feed sent to user devices appropriate URIs for that device 112, manifests containing appropriate URIs for that device 112, or alternatively intermediate URIs, or manifests containing intermediate URIs that will lead, through HTTP redirection or other similar techniques, to appropriate URIs for that device 112. In this manner, when a content item, URI, intermediate URI, or manifest containing URIs or intermediate URIs is requested by the user, it will be requested from the aggregation system 108 or a system associated with the aggregation system 108, rather than directly from the service feed provider 126. The operator of the aggregation system 108 can operate systems that encode, transcode, and/or segment files, can utilize an outside service that encodes, transcodes, and/or segments files, or can utilize an outside service that provides URIs, intermediate URIs, manifests containing URIs, and/or manifests containing intermediate URIs that identify the content in a form appropriate for the device 112.

Continuing with this implementation, a URI sent to the device 112 can include or encode parameters associated with digital advertising management, options, processes, or alternatives, which can then be passed through to digital advertising servers or services, either directly or after combination with other information or parameters. Alternatively, the parameters can be retrieved from a file or table, can be generated, or can otherwise be determined. These parameters can influence or control the selection of advertising servers or services for some or all of the available advertising units, the trafficking of advertisements into available advertising units, or other aspects of the digital advertising process.

Continuing with this implementation, before, during, after, or in conjunctions with content selection or playback by the user 112, the operator of the aggregation system 108 or associated system can then issue a request to the advertising server or service identified by the service feed provider 126, receive in response a designation of which advertisement to insert before, after, or into, or display in conjunction with, the content during the content playback experience, and can insert or display the correct advertisement, at the correct position, in a properly encoded and segmented form, into the playback experience on behalf of the service feed provider 126. The advertisement can be inserted by any of, all of, or any combination of: the user interface 312, the user's device 112, by inserting URLs or intermediate URLs referencing the advertisement into manifests sent to the user's device 112, by inserting manifests containing URLs or intermediate URLs referencing the advertisement into the sequence of manifests sent to the user's device 112, or directly into the content sent to the user's device 112, either at the time the content is requested or in a preparation step before the content is requested. At, during, after, or in conjunction with the playback or display of the advertisement, the operator of the aggregation system 108 can then report completion of the advertisement playback or display to one or more advertising servers or services or other reporting servers or services, identified by or associated with the service feed provider, on behalf of the service feed provider 126. The operator of the aggregation system 108 can also report progress through, completion of, and other analytical characteristics of the content video playback activity of the user to one or more reporting and/or measurement servers or services identified by, or associated with, the service feed provider, on behalf of the service feed provider.

This implementation can support multiple service feed providers 126, providing independent XML feeds of content items as they are published or available and XML feeds of advertisements, employing different advertising servers or services (while also supporting multiple service feed providers 126 that use the same advertising servers or services, by identifying to the advertising measurement server or service the service feed provider 126 on whose behalf the operator of the aggregation system 108 is reporting), and employing different reporting and/or measurement servers or services (while also supporting multiple service feed providers 126 using the same reporting and/or measurement servers or services, by identifying to the reporting and/or measurement server or service the service feed provider 126 on whose behalf the operator of the aggregation system 108 is reporting). This implementation can concurrently support multiple different user interfaces 312 operating on multiple different devices 112 interacting with multiple advertising servers or services and multiple reporting and/or measurement servers or services on behalf of multiple service feed providers 126, or independently of any individual service feed provider 126.

Other implementations of this aspect of the primary and other embodiments can provide digital advertising execution and user activity reporting through requests made, and reports sent, by the user interface 312; the user device 112; a component of, facility of, or other program operating on the user device 112; or a network connected, directly or via another network, to the user device 112. In all such implementations the requests and reports can be made either directly to the advertising server(s) or service(s) and/or reporting and/or measurement server(s) or service(s), or to an intermediate server or service operated by the operator of the aggregation system 108 or another service operator. The operator of the aggregation system 108 or another service operator can maintain and/or provide, to the user interface 312, user device 112, or other requesting and reporting servers or services, one or more datasets, data records, data elements, or other input information that identifies for each participating service feed provider the advertising server(s), reporting and/or measurement server(s), request formats, reporting protocols, and other necessary technical and interface information, addresses, protocols, formats, and authentication techniques so that the user interface 312, user device 112 or other requesting and reporting server or service can successfully request and/or report to the correct servers and/or services on behalf of each service feed provider 126. In such implementations, the operator of the aggregation system 108 or other service operator can provide and periodically update one or more datasets, data records, data elements, or other input information thereby enabling the user interface 312, user device 112, or other requesting and reporting servers or services to make multiple requests by accessing the datasets, data records, data elements, or other inputs multiple times between communications with the operator of the aggregation system 108 or other service operator; or, the operator of the aggregation system 108 or other service operator can maintain one or more datasets, data records, data elements, or other input information and enable the user interface 312, user device 112, or other requesting and reporting servers or services to access, interact with, communicate with, or otherwise obtain information as needed from the datasets, data records, data elements, or other input information each time such information is needed; or, the operator of the aggregation system 108 or other service operator can act as a communications hub or point, e.g. a clearinghouse, enabling the user interface 312, user device 112, or other requesting and reporting servers or services to access, interact with, communicate with, or otherwise obtain information as needed, or in advance of as needed, from it, while it in turn accesses the datasets, data records, data elements, or other input information from service feed providers, Internet services 206, shared content management systems, or other sources of such information, as such information is requested, or in advance of such requests. These implementations can concurrently support multiple different user interfaces 312 operating on multiple different devices 112 interacting with multiple advertising servers or services and multiple reporting and/or measurement servers or services on behalf of multiple service feed providers 126, or independently of any individual service feed provider 126.

In another optional aspect of the primary and other embodiments, the operator of the aggregation system 108 can signal advertising load characteristics, or whether or not to insert an advertisement, to multiple service feed providers 126 such that the overall advertising load experienced by a user can be coordinated among multiple service feed providers 126, and so that each service feed provider 126 can receive a share of the total available advertising load. This can help prevent the individual actions of service feed providers 126, in deciding how many advertisements to insert and which video playbacks to insert them into, from combining in an uncoordinated way to saturate the user's playback experience with too many advertisements. In one implementation of this aspect of the primary and other embodiments, the user interface 312 or user device 112 includes a parameter with each requested service feed item 308 that signals whether or not an advertisement should be inserted into the requested content item. In another implementation of this aspect of the primary and other embodiments, the user interface 312, user device 112, aggregation system 108, or other system making requests to an advertising server on behalf of the service feed provider 126 includes a parameter with each requested service feed item that signals whether or not an advertisement should be inserted into the requested content item. In another implementation of this aspect of the primary and other embodiments, the user interface 312, user device 112, aggregation system 108, or other system making requests to an advertising server on behalf of the service feed provider 126 manages the overall advertising load by not making a request to the advertising server, which results in a content item without an advertisement inserted into it. I any such implementation, the advertising load is managed to an acceptable level for the user while at the same time the available advertising load is distributed among the service feed providers 126 according to each service feed provider's share, overall load objectives, or other objectives. In this manner, the user interface 312, user device 112, aggregation system 108, or other system operates to coordinate the advertisement insertions among the participating service feed providers. In other embodiments, the service feed providers 126 insert advertising avails into the content item or in metadata where the aggregation system 108 can insert advertising.

In an optional aspect of the primary and other embodiments, Feeds can include items added to the Feed that are not feed content items. Additional items can include identifiers of the feed provider, service provider, or other provider, or of the date, day part, season, device, place, network, or other party; introductory, opening, or summary items at the top of a Feed or Feed Item; summary or closing items at the bottom of a Feed, Feed Item, or group of feed items; transitional multimedia items between feed items; and other items added to the feed that are not feed content items.

In an optional aspect of the primary and other embodiments, a service feed presented to a user may be comprised of feed items from more than one service feed 206, presented without attribution to, identification of, or separation by, the contributing content provider. An Internet service 126, for example, could gather feed items from multiple sources and aggregate those feed items into a service feed 206 that is passed to the aggregation system 108.

In an optional aspect of the primary and other embodiments, the Feeds, and/or other Feed Items associated with a user 116 can be accessed, searched, indexed, correlated, or used in responding to search requests made by the user 116, other users 116 associated with or authorized by the user 116, other users 116 of the aggregation system 108 or other users of search services generally. For example, a user 116 may make one or more of or even all their Feeds public such that they could be searched by other users 116.

The search provider can provide to the operator of the aggregation system 108 or a system associated with the aggregation system 108 a user identifier, such as a user name or number, device name or number, global unique identifier associated with a user or device, IP address, host number, or any combination thereof, along with one or more search terms, keywords, categories, or other search indicators. The operator of the aggregation system 108 or other system associated with the aggregation system 108 can provide to the search provider specific feed items that are responsive to the search terms, keywords, categories, or other search indicators, from the service feeds 206, Feed Items associated with the user 116 identified by the user identifier, other users 116 associated with the user 116 identified by the user identifier, or of users 116 of the aggregation system 108. Items responsive to the search terms, keywords, categories or other search indicators can be prioritized, ranked, scored, and/or weighted based on data collected by the operator of the aggregation system 108, including, but not limited to, sharing activity, viewing activity, rating activity, following or subscribing activity, or other user activity regarding one or more feed items, content provider feeds, keywords, or categories, based on activity of the user 116, users associated with the user 116, users of another Internet service 206, or users of the aggregation system 108.

Alternatively, the operator of the aggregation system 108 or other system associated with the aggregation system 108 can provide to the search provider one or more user identifiers, such as user names or numbers, device names or numbers, global unique identifiers associated with users or devices, IP addresses, host numbers, or any combination thereof, along with one or more Internet domains, Internet services, Feeds, keywords associated with one or more Feeds, composition characteristics of Feeds or characteristics of other Feeds, Feed Items associated with each user 116 identified by a user identifier or of other users 116 associated with each user 116 identified by a user identifier.

Alternatively, the operator of the aggregation system 108 or other system associated with the aggregation system 108 can provide to the search provider with one or more Internet domains, Internet services, Feeds, keywords associated with one or more feeds, composition characteristics of feeds or Feeds, characteristics of other Feeds, and/or Feed Items associated with all users 116 or subsets of users 116 of the aggregation system 108.

Search providers can include search service operators, device manufacturers, network access or service providers, software providers, or any other operator of a search service.

Implementation of the interface between the search provider and the operator of the aggregation system 108 or other system associated with the aggregation system 108 can include any of, all of, or any combination of: execution as part of the user interface 312; as part of the device 112; as part of the aggregation system 108; as part of a system associated with the aggregation system 108; as part of an Internet service 206 associated with the aggregation system 108 and/or the user 116; as a system or programming interface of the search provider or a system associated with the search provider; as another system or programming interface; as another Internet service 206; through a programming interface or other digital interface of the device, the operating system executing on the device 112, or other software executing on the device 112; or through a programming interface or other digital interface available in conjunction with the network connected, directly, indirectly, or through an intermediate network, to the user device 112.

In an optional aspect of the primary and other embodiments, the aggregation system 108, a system associated with the aggregation system 108, a system associated with the user interface 312 or device 112, a system associated with some or all of the devices 112 on which instances of the user interface 312 execute, a system associated with software operating on some or all of the devices 112 on which instances of the user interface 312 execute, a system associated with one or more files or other data created by, stored on, or processed by some or all of the devices 112 on which instances of the user interface 312 execute, a system associated with some or all service feed providers, a system associated with some or all of the networks connected, directly, indirectly, or through an intermediate network to some or all of the devices on which instances of the user interface 312 execute, or another system or service can receive, accumulate, parse, process, summarize, divide into subsets, and otherwise manipulate data elements, data records, data sets, or other information comprising numerical, statistical, quantitative, qualitative, descriptive, or other information about actions, interactions, events, and other behavior and activities started, stopped, completed, made, or taken by users 116 as they engage with the user interface 312 or device 112, other interfaces to the aggregation system 108 or Internet services 126 connected to the aggregation system 108, Feeds, Feed Items, icons 830, tiled icons 830-6, 830-7, controls, data entry fields, and/or other elements of the user interface 312 or device 112. In addition, such accumulated data can, but need not necessarily, include user authentication method, user identity, anonymized unique user identifiers such as globally unique identifiers, location, date, time, device identifier, network identifier, connectivity mode, operating system and other software component identifiers, user input device identifier, and other information. The accumulated data can be divided into subsets by, and exported to, one or more service feed providers, manufacturers of devices 112 on which instances of the visual user interface 312 execute, developers of other software that executes on devices 112 on which instances of the visual user interface 312 execute, providers of networks connected, directly, indirectly, or through an intermediate network to some or all of the devices 112 on which instances of the visual user interface 312 execute, providers of Internet services 206, advertising agencies, advertising measurement and reporting servers or services, audience measurement and reporting servers or services, or other measurement and reporting servers or services.

Figure 12:
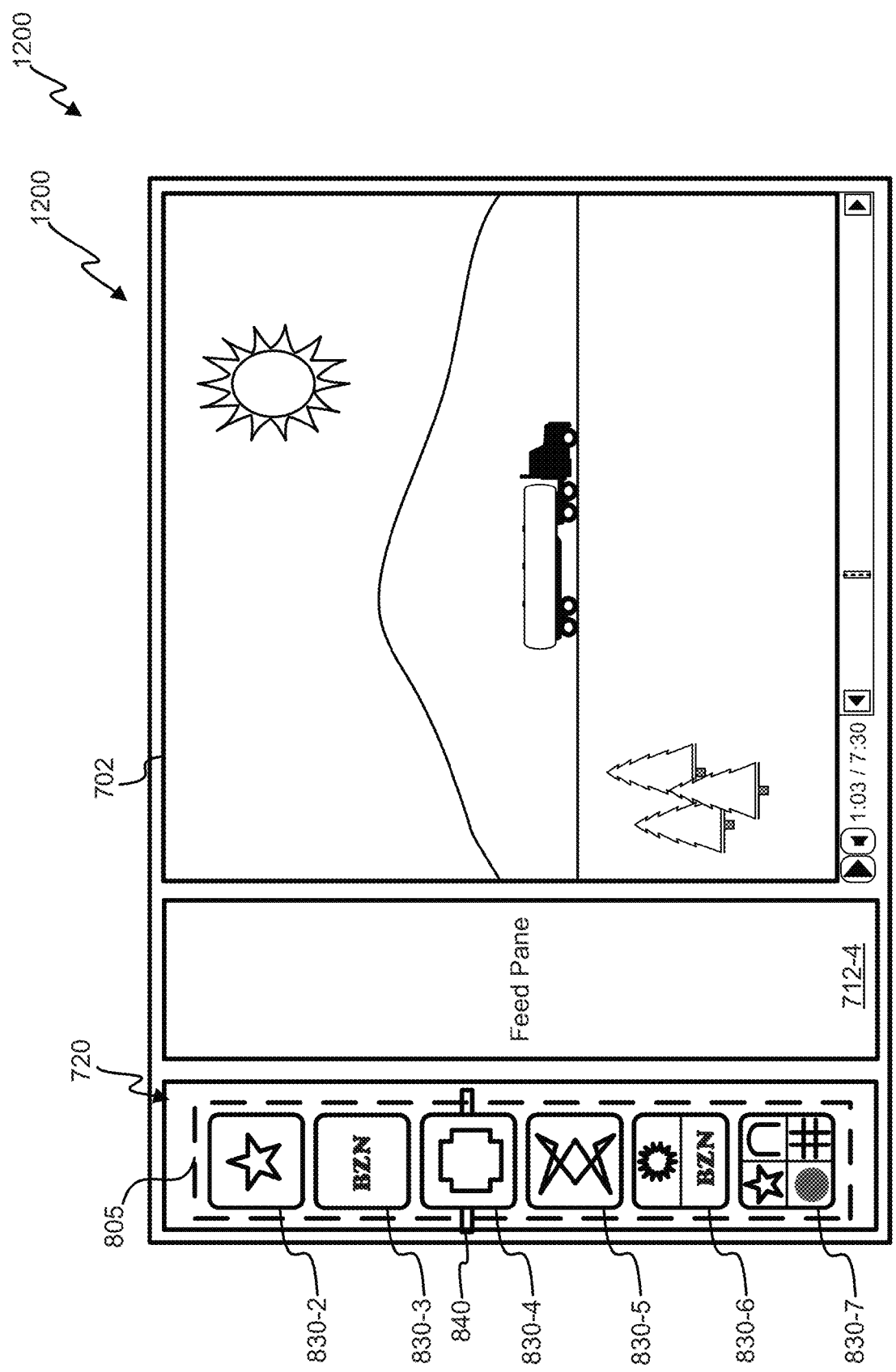
FIG. 12 depicts still another embodiment of the user interface to the aggregation system.

Referring next to FIG. 12, an embodiment of a single pane view 1200 of the user interface 312 is shown. In this embodiment, a channel carousel 805 rotates to select a single icon 830-4 denoted by a radio dial 840. The feed pane 712-4 corresponding to the selected icon 830-4 is shown. The user can select a Feed Item in the feed pane 712 that is shown in the video window 702. The video window 702 may be selected to go full screen to occupy the entire single pane view or may automatically do so after playback is begun or after a delay once playback is begun. In this embodiment, the single pane view 1200 is displayed on a television using a built-in player, a set top box, a DVD or Blu-Ray player, a video streaming device, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A video processing system for providing personalized video content feeds to users from the Internet, the video processing system comprising:
a service feed that is:
acquired from an internet service, which is accessible from the Internet, and
updated a plurality of times, wherein:
the service feed comprises a plurality of feed items arranged in the first service feed serially, and
the service feed includes the plurality of feed items that each include a first separately resolvable link to another content item available from the Internet;
an aggregation system that is configured to:
receive the service feed,
remove from the service feed a plurality of non-video feed items that do not link to video content available from the Internet because the plurality of non-video feed items do not link to video content,
remove from the service feed a plurality of filtered feed items that either meet or do not meet a predetermined criteria,
a selective video feed comprising a plurality of remaining feed items that exclude the plurality of non-video feed items and the plurality of filtered feed items.

2. The video processing system for providing personalized video content feeds to users from the Internet as recited in claim 1, wherein the predetermined criteria is a username, keyword, rating, artist, genre, and/or category associated with a feed item.

3. The video processing system for providing personalized video content feeds to users from the Internet as recited in claim 1, wherein the service feed is gathered in association with unique credentials for a first user of the Internet service, and the feed items are used to formulate a plurality of selective video feeds for a plurality of other users of the Internet service.

4. The video processing system for providing personalized video content feeds to users from the Internet as recited in claim 1, wherein the selective video feed is played serially to the user by the aggregation system.

5. The video processing system for providing personalized video content feeds to users from the Internet as recited in claim 1, wherein:
the selective video feed is played serially to the user by playing video excerpts serially to the user, and
the video excerpts are only a portion of the corresponding feed item video.

6. The video processing system for providing personalized video content feeds to users from the Internet as recited in claim 1, wherein the selective video feed is presented through a web site coupled with the aggregation system.

7. The video processing system for providing personalized video content feeds to users from the Internet as recited in claim 1, wherein:
the Internet service requires unique credentials of a user before allowing access to the service feed.

8. The video processing system for providing personalized video content feeds to users from the Internet as recited in claim 1, wherein:
a second Internet service is provided credentials identifying a user of the aggregation system as a user of the second Internet service, and
the aggregation system receives second feed items returned by the second Internet service for the user.

9. The video processing system for providing personalized video content feeds to users from the Internet as recited in claim 8, wherein:
a plurality of the second feed items received from the second Internet service are music or video feed items.

10. The video processing system for providing personalized video content feeds to users from the Internet as recited in claim 1, wherein the selective video feed is filtered by the aggregation system to exclude one or more possible rendering agents.

11. A method for providing personalized video content feeds to users from the Internet, the method comprising:
acquiring a service feed, including a plurality of feed items arranged serially that link to content objects, which are available from the Internet with an Internet service;
updating the service feed a plurality of times;
filtering the service feed to remove from the service feed a plurality of non-video feed items that do not link to video content available from the Internet because the plurality of non-video feed items do not link to video content;
filtering the service feed to remove from the service feed a plurality of filtered feed items that either meet or do not meet a predetermined criteria; and
sending a selective feed to a user that comprises a plurality of remaining feed items that exclude the plurality of non-video feed items and the plurality of filtered feed items.

12. The method for providing personalized video content feeds to users from the Internet as recited in claim 11, the method further comprising processing feed items in the video selective feed into a consistent user interface that serially plays the feed items.

13. The method for providing personalized video content feeds to users from the Internet as recited in claim 11, wherein the predetermined criteria is a username, keyword, rating, artist, genre, and/or category associated with a feed item.

14. The method for providing personalized video content feeds to users from the Internet as recited in claim 11, further comprising:
sending second Internet service credentials identifying a user of the aggregation system as authenticated for the second Internet service, and
receiving a plurality second feed items from the second Internet service for the user.

15. The method for providing personalized video content feeds to users from the Internet as recited in claim 14, further comprising:
receiving from the second Internet service a plurality of music or video content items returned by the second Internet service as the plurality of second feed items;
communicating the plurality of second feed items to a player associate with the user.

16. The method for providing personalized video content feeds to users from the Internet as recited in claim 11, further comprising:
gathering of feed items for use by a second user from the Internet service associated with unique credentials of the first user.

17. A method for providing personalized video feeds to a user gathered from the Internet, the method comprising:
receiving selection of a service feed, including a plurality of feed items arranged serially that link to content objects, which are available from the Internet from an Internet service;
receiving from the user a criteria specifying filtering of the Internet service;
updating the service feed a plurality of times to provide the plurality of feed items;
removing from the service feed those feed items of the service feed that do not link to video objects available over the Internet because the plurality of non-video feed items do not link to video content;
removing from the service feed those feed items of the service feed that are specified by the criteria; and
sending a subset of the plurality of feed items toward the user, where the subset is defined by the two preceding removing limitations.

18. The method for providing personalized video feeds to the user gathered from the Internet as recited in claim 17, wherein the criteria includes one or more of an account or username, keyword, rating, artist, genre, and/or category associated with a feed item.

19. The method for providing personalized video feeds to the user gathered from the Internet as recited in claim 17, further comprising:
sending a second Internet service credentials identifying a user of the aggregation system as a user of the second Internet service;
receiving from the second Internet service a second plurality of feed items returned by the second Internet service for the user; and
passing the second plurality of feed items to a player associated with the user.

20. The method for providing personalized video feeds to the user gathered from the Internet as recited in claim 19, wherein the second Internet service provides music or video feed items as the second plurality of feed items.

* * * * *

UNITED STATES PATENT AND TRADEMARK OFFICE
CERTIFICATE OF CORRECTION

Page 1 of 1

PATENT NO. : 8,613,015 B2
APPLICATION NO. : 13/469717
DATED : December 17, 2013
INVENTOR(S) : Michael M. Gordon et al.

It is certified that error appears in the above-identified patent and that said Letters Patent is hereby corrected as shown below:

On the title page, item [63], domestic priority information is omitted.

On page 1, insert the following paragraph 63:

--Related U.S. Application Data

(63)    Continuation of application No. PCT/US2012/035854 filed on April 30, 2012, which is a Continuation-in-part of application No. 13/296,183 filed on November 14, 2011, now Pat. No. 8,583,759, which is a Continuation of application No. PCT/US2011/034653 filed on April 29, 2011. This application is also a Continuation of application No. 13/460,305 filed April 30, 2012, now Pat. No. 8,566,722, which is a Continuation-in-part of application No. 13/296,183 filed November 14, 2011, now Pat. No. 8,583,759.--

Signed and Sealed this
Second Day of September, 2014

Michelle K. Lee
*Deputy Director of the United States Patent and Trademark Office*